(12) United States Patent
Chau et al.

(10) Patent No.: US 9,933,780 B2
(45) Date of Patent: Apr. 3, 2018

(54) SYSTEMS AND METHODS FOR REMOTE DISTRIBUTED CONTROL OF UNMANNED AIRCRAFT

(71) Applicant: QUALCOMM Incorporated, San Diego, CA (US)

(72) Inventors: Kiet Tuan Chau, San Diego, CA (US); Michael-David Nakayoshi Canoy, San Diego, CA (US); Michael Orlando DeVico, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/741,888

(22) Filed: Jun. 17, 2015

(65) Prior Publication Data
US 2016/0370800 A1    Dec. 22, 2016

(51) Int. Cl.
*G05D 1/00* (2006.01)
(52) U.S. Cl.
CPC ......... *G05D 1/0061* (2013.01); *G05D 1/0011* (2013.01); *G05D 1/0088* (2013.01)
(58) Field of Classification Search
CPC ...... G05D 1/00; G05D 1/0061; G05D 1/0011; G05D 1/0088
See application file for complete search history.

(56) References Cited

U.S. PATENT DOCUMENTS

| | | | |
|---|---|---|---|
| 5,240,207 A | 8/1993 | Eiband et al. | |
| 7,451,023 B2 | 11/2008 | Appleby et al. | |
| 7,778,744 B2 | 8/2010 | Rath et al. | |
| 8,103,398 B2 | 1/2012 | Duggan et al. | |
| 8,838,289 B2 | 9/2014 | Margolin | |
| 9,488,979 B1* | 11/2016 | Chambers | B64C 39/00 |
| 2012/0237028 A1* | 9/2012 | Khazan | G05D 1/0022 380/201 |
| 2014/0324253 A1 | 10/2014 | Duggan et al. | |
| 2015/0073624 A1 | 3/2015 | Takahashi et al. | |
| 2015/0142244 A1 | 5/2015 | You et al. | |

(Continued)

OTHER PUBLICATIONS

Mouloua, Mustapha, et al., "Workload, Situation Awareness, and Teaming Issues for UAV/UCAV Operations", Proceedings of the Human Factors and Ergonomics Society 45th Annual Meeting, Oct. 2001, p. 162-165 (Year: 2001).*

(Continued)

*Primary Examiner* — Genna M Mott
(74) *Attorney, Agent, or Firm* — The Marbury Law Group, PLLC

(57) ABSTRACT

Methods, systems, and devices are disclosed for providing control of an unmanned aircraft (UA). A server may receive an indication from a UA that a transition from autonomous flight to pilot controlled flight is required while the UA is in autonomous flight. The server may select a pilot station for providing pilot controlled flight of the UA. Selecting a pilot station for providing pilot controlled flight of the UA may be based on a pilot criterion associated with the pilot station. A UA may detect a condition that requires a transition from autonomous flight to pilot controlled flight and establish a pilot criterion for pilot controlled flight based on the detected condition. The UA may send a request for a pilot that includes the pilot criterion and information about the condition.

28 Claims, 19 Drawing Sheets

(56) References Cited

U.S. PATENT DOCUMENTS

2015/0149088 A1* 5/2015 Attard .................... G01C 21/36
701/538
2015/0248131 A1* 9/2015 Fairfield .............. G05D 1/0044
701/2

OTHER PUBLICATIONS

Partial International Search Report—PCT/US2016/033551—ISA/EPO—dated Aug. 8, 2016.
Chen J.Y.C., et al., "Supervisory Control of Multiple Robots: Human-Performance Issues and User-Interface Design," IEEE Transactions on Systems, Man, and Cybernetics: Part C: Applications and Reviews, IEEE Service Center, Piscataway, Nj, US, Jul. 1, 2011 (Jul. 1, 2011), vol. 41(4), pp. 435-454, XP011366753, ISSN: 1094-6977, DOI: 10.1109/TSMCC.2010.2056682.
International Search Report and Written Opinion—PCT/US2016/033551—ISA/EPO—dated Nov. 7, 2016.
Murray C.C., et al., "Incorporating Human Factor Considerations in Unmanned Aerial Vehicle Routing," IEEE Transactions on Systems, MAN, and Cybernetics: Systems, IEEE, Piscataway, Nj, USA, Jul. 1, 2013 (Jul. 1, 2013), vol. 43(4), pp. 860-874, XP011514690, ISSN: 2168-2216, DOI: 10.1109/TSMCA.2012.2216871.

* cited by examiner

SYSTEMS AND METHODS FOR REMOTE DISTRIBUTED CONTROL OF UNMANNED AIRCRAFT

BACKGROUND

As the use of unmanned aircraft (UA), unmanned aerial vehicles (UAVs), drones, etc., (referred to hereinafter as "UA" or "UAs") becomes increasingly common, controlling UAs in various modes of flight becomes increasingly important.

In the national airspace system (NAS), UA flight is regulated by the Federal Aviation Administration (FAA). Under the current regulatory landscape, the FAA requires that each UA is piloted by at least one pilot, typically while maintaining visual line of sight to the UA vehicle. However, in the near future, regulations are expected to allow for the autonomous flight of UAs.

Even during autonomous flight, a need may arise for a pilot to take control of the UA, such as during flight anomalies, corner cases, or adverse conditions where pre-programmed instructions will not be sufficient for maintaining safe flight for the UA. Challenges remain for adequately facilitating the handoff of a UA from autonomous flight to piloted flight under these circumstances.

SUMMARY

Various embodiments include methods and devices, which may include a server, implementing the methods for managing control of an unmanned aircraft (UA). An embodiment method may include receiving an indication from a UA in autonomous flight that a transition from autonomous flight to pilot controlled flight is required while the UA is in autonomous flight, and selecting a pilot station for providing pilot controlled flight of the UA based on a pilot criterion. An embodiment method may further include linking the selected pilot station to the UA, and relaying flight data from the UA to the selected pilot station and flight control data from the pilot station to the UA.

In various embodiments, the pilot criterion or a set of pilot criteria a may include one or more of: an overall length of pilot experience; a length of pilot experience associated with a condition upon which the transition from autonomous flight to pilot controlled flight is based; a length of pilot experience associated with the UA; a pilot physical condition; a pilot mental condition; a pilot flight recency; a pilot affiliation; a pilot qualification; a pilot flight certification status; a pilot medical certification status; a pilot ready status; a pilot incident history; a pilot crash history; a pilot availability status; a geographic proximity of the pilot to the UA; and a quality of a network connection of the pilot.

In an embodiment method, receiving an indication from a UA that a transition from autonomous flight to pilot controlled flight is required may include receiving with the indication a condition that requires the transition from autonomous flight to pilot controlled flight and establishing a criterion for inclusion in the pilot criteria based on the condition that requires the transition from autonomous flight to pilot controlled flight. In various embodiments, the condition may include one or more of: a weather condition; a geographic condition; a visibility condition; a UA mechanical condition; a UA instrument condition; a communication link quality condition; a mission requirement condition; a UA type; a UA characteristic; and an emergency condition. In an embodiment method, selecting a pilot station for providing pilot controlled flight of the UA based on the pilot criteria may include selecting one or more pilot candidates to pilot the UA based on the pilot criteria, and transmitting a message to the one or more pilot candidates offering a mission to pilot the UA to the one or more pilot candidates.

An embodiment method may further include receiving one or more acceptances from the one or more pilot candidates accepting the offered mission to pilot the UA, and selecting one of the pilot candidates accepting the offered mission to pilot the UA based on the pilot criteria and the condition that requires the transition from autonomous flight to pilot controlled flight.

Further embodiments may include an apparatus having at least a transceiver, and a processor configured with processor executable instructions to perform operations of the embodiment methods described above. Further embodiments may include a server having means for performing operations of the embodiment methods described above. Further embodiments may include a non-transitory processor-readable storage medium on which are stored processor-executable instructions to perform operations of the embodiment methods described above.

Various embodiments may further include methods and devices, which may include an unmanned aircraft (UA), for managing control of the UA. Some embodiment methods may include detecting a condition that requires a transition from autonomous flight to pilot controlled flight while the UA is in autonomous flight, and establishing pilot criteria for providing pilot controlled flight of the UA based on the detected condition. Some embodiment methods may further include sending a request for a pilot to perform pilot controlled flight of the UA, the request for a pilot including the pilot criteria and information about the condition. Some embodiment methods may further include receiving mapping information for a pilot station that is selected to perform pilot controlled flight of the UA based on the request, and establishing a link to the pilot station based on the received mapping information. Some embodiment methods may further include receiving on the established link to the pilot station, flight control data configured to control the flight of the UA, and relaying, on the established link to the pilot station, flight control feedback data to the selected pilot station.

In some embodiment methods, the flight control data may include flight commands for enabling the pilot controlled flight of the UA, and flight control feedback data may include one of: a UA flight instrument data feed; and a UA flight video data feed.

Further embodiments may include a UA having at least a transceiver, and a processor configured with processor executable instructions to perform operations of the embodiment methods described above. Further embodiments may include a UA having means for performing operations of the embodiment methods described above. Further embodiments may include a non-transitory processor-readable storage medium on which are stored processor-executable instructions to perform operations of the embodiment methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
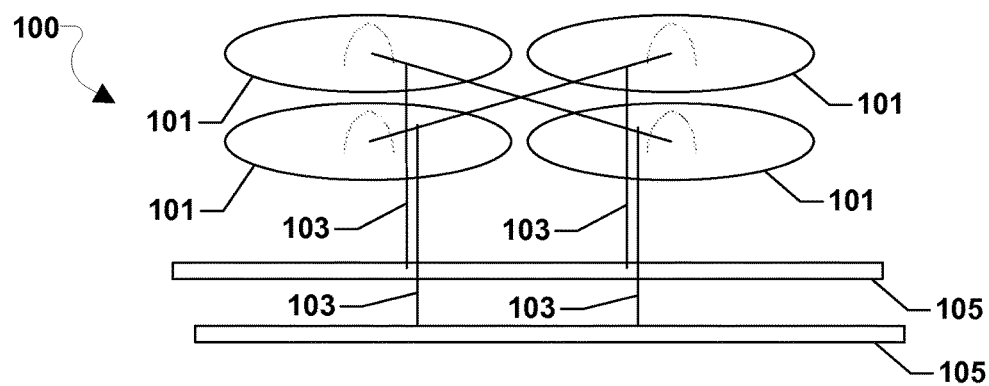
FIGS. 1A-FIG. 1C are diagrams illustrating components of an unmanned aircraft (UA) suitable for use in various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments involve a system and method for selecting an appropriate pilot to take control of a drone, unmanned aerial vehicle (UAV), or an unmanned aircraft, which may be referred to hereinafter interchangeably as a "UA." The UA may be in an autonomous flight mode when the UA recognizes that a pilot is required based on a given condition, which may be referred to as a transition condition. The need for transition to piloted flight may be for any number of reasons, such as due to (but not limited to) specific triggering conditions, adverse weather, equipment issues, UA communication channel degradation, etc. Alternatively or additionally, the transition condition may be determined externally, such as by a weather monitoring system that may alert the UA when an adverse weather condition is impending that may require piloted flight. When triggering or transition conditions are detected, the UA may place a request for a pilot to a control system, such as a gateway/server/central node.

In some embodiments, the UA may establish a pilot criterion or a set of criteria that correspond to the detected condition. Alternatively or additionally, the pilot criteria may be based on the type of UA (e.g., rotor, fixed-wing, etc.), the characteristics of the UA (e.g., size, model, radar equipped, navigation equipped, etc.) In other words, particular UAs may require particular pilots or particular pilot criteria. Alternatively or additionally, the control system (e.g., gateway/server/central node) may determine pilot criteria that correspond to the detected condition and notify the UA of the condition. For example, the detected condition may be a severe weather alert, which may require a pilot with more than two years of experience flying in the detected weather condition (e.g., wind shear, etc.). Thus, the pilot criteria may include that a pilot must have more than two years flying in the detected weather condition. The gateway/server/central node may offer the mission to any pilots satisfying the required criteria. The gateway/server/central node may alternatively or additionally select a most appropriate pilot or pilots for the UA mission from among a number of pilots standing by, such as pilots and/or pilot stations that already meet the criteria and have indicated that they are available for a UA mission.

The pilots may accept or reject the UA mission offer from the gateway/server/central node. If multiple pilots accept the mission, the gateway/server/central node may further select from among the accepting pilots. For example, the gateway/server/central node may select the most qualified from among the accepting pilots. The gateway/server/central node may connect the pilot station of the accepting pilot to the UA and/or a UA client half, enabling the pilot to take control of the UA. Pilots may be selected for a requesting UA based on various criteria, such as (but not limited to) experience, affiliation, instrument rating, experience with the UA, experience flying UAs in the location of the UA, and/or any combinations thereof. Other criteria for selecting pilots may include the geographic proximity of the pilot to the drone (or the drone destination, route(s), etc.), the quality of the network connection to the pilot station module, or other factor that may impact the pilot's ability to control the UA. For example, a large distance between the UA and the pilot may result in degraded control capabilities or responsiveness due to lag resulting from a slow or poor quality network connection. Thus, while a pilot half-way around the world may be the best pilot for the mission, the pilot criteria may exclude that pilot due to the likelihood that the network connection to the pilot station module may have unacceptable delays and/or be or become unreliable. Thus, various embodiments provide methods and a distributed control system or central gateway that receives a pilot request from a UA, offers the UA piloting mission to selected pilots who meet the criteria for the condition, and if the mission is accepted, selects a best pilot to take over and establishes the communication link between that pilot and the UA.

In various embodiments, a control system, server, gateway node, or similar element may be configured to perform various operations. The control system may be an external facing server/device with which pilot stations, UAs, and potential controller stations can connect, such as through a dedicated network or the Internet. The control system may be responsible for selecting and connecting pilots/pilot stations to UAs that require a live pilot based on various conditions. The control system may further route or facilitate the routing of data, messages, etc., between the UA and the pilot station, may facilitate the authentication of pilot stations and UAs, and so on. The control system may provide data such as updated flight plans, weather, temporary flight restrictions, traffic alerts, etc. to the pilot such as at the time of offering or assigning the mission to the pilot.

A UA may be configured to fly to a location or destination (e.g., to deliver a package). The flight of the UA may include transitioning from autonomous flight to piloted flight according to various embodiments. An example of a UA 100 configured for basic package delivery is illustrated in FIGS. 1A through 1D. In some embodiments, the UA 100 may include a number of rotors 101, a frame 103, and landing skids 105. The frame 103 may provide structural support for motors associated with the rotors 101 and the landing skids 105. The structural support of the frame 103 may be sufficiently strong to support the maximum load weight for the combination of the components of the UA 100 and, in some cases, a package or payload 109.

For ease of description and illustration, some detailed aspects of the UA 100 are omitted such as wiring, frame structure interconnects or other features that would be known to one of skill in the art. For example, while the frame 103 is shown and described as having a number of support members or frame structures, the UA 100 may be constructed using a molded frame in which support is obtained through the molded structure. In the illustrated "quadcopter" embodiments, the UA 100 has four of the rotors 101. However, more or fewer than four rotors 101 may be used. Also, different physical constructions are possible that may depart partially or entirely from the "copter" configuration, while remaining generally consistent with the embodiments described herein.

For example, in some embodiments, the UA 100 may be a winged airplane configuration with forward, rearward, and/or wing mounted, front/rear/variable facing propulsion units. Further, the UA 100 may be configured for different missions other than or in addition to package delivery as described. For example, the UA 100 may be equipped for weather sounding, video surveillance and image capture, agricultural spraying, or other missions.

The UA 100 may proceed in autonomous flight and may transition to piloted flight based on determining that certain conditions are present that necessitate a pilot (also referred to as "piloted flight") to at least partially control the UA 100. In some embodiments, the conditions giving rise to the need to transition to piloted flight may be related directly to the mission that the UA 100 is carrying out. In other embodiments, the mission that the UA 100 is carrying out may form at least part of the conditions leading to the determination that a transition to piloted flight is required and may form at least part of the criteria for offering a piloting mission for piloting the UA. In some embodiments, the conditions may be general conditions that are unrelated to the specific mission.

Figure 1B:
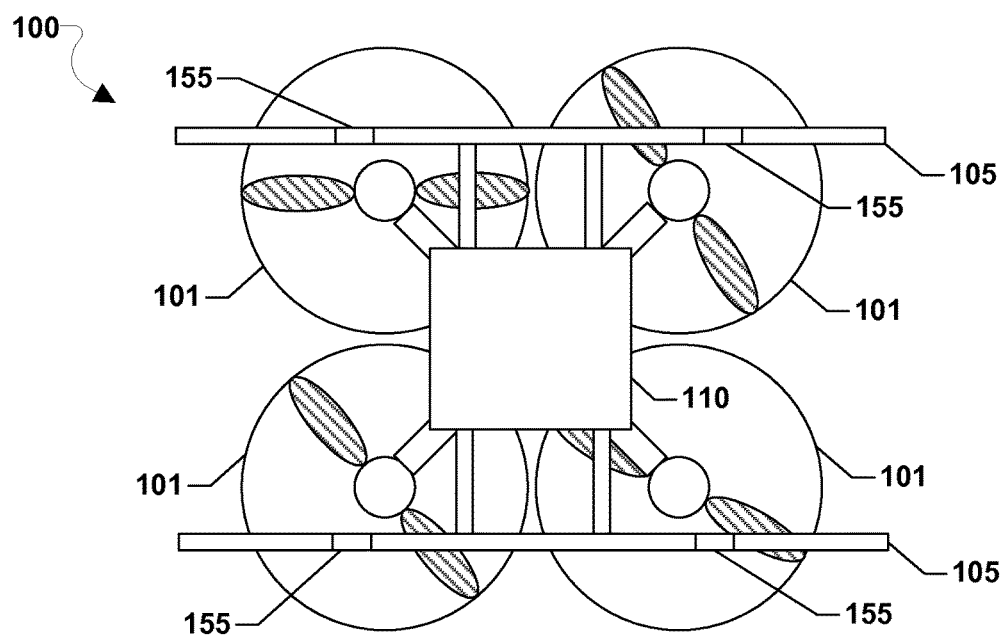

As illustrated in FIG. 1B, in some embodiments, the landing skids 105 of the UA 100 may be provided with landing sensors 155. With reference to FIGS. 1A-1B, the landing sensors 155 may be optical sensors, radio sensors, camera sensors, or other sensors. Alternatively or additionally, the landing sensors 155 may be contact or pressure sensors that may provide a signal that indicates when the UA 100 has made contact with a surface. In some embodiments, the landing sensors 155 may be adapted to provide the additional ability to charge a battery (e.g., power module 150 in FIG. 1D) of the UA 100 when the UA 100 is positioned on a suitable landing pad, such as through charging connectors. In some embodiments, the landing sensors 155 may provide additional connections with a landing pad, such as wired communication or control connections. The UA 100 may further include a control unit 110 that may house various circuits and devices used to power and control the operation of the UA 100, including motors for powering rotors 101, the battery, a communication module, and so on.

Figure 1C:
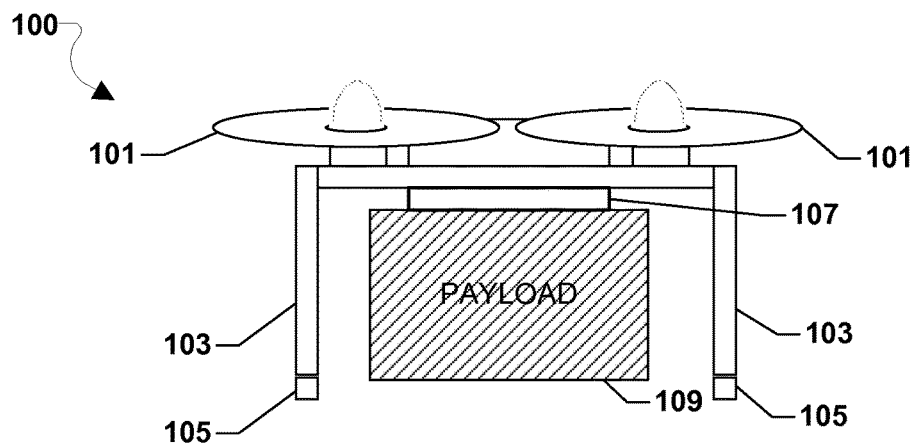

As illustrated in FIG. 1C, in some embodiments, the UA 100 may further be equipped with a payload-securing unit 107. With reference to FIGS. 1A-1C, the payload-securing unit 107 may include an actuator motor (not shown) that drives a gripping and release mechanism and related controls that are responsive to the control unit 110 to grip and release a payload 109 in response to commands from the control unit 110. While the payload-securing unit 107 may grip and release the payload 109 in package delivery mission embodiments, other additional or alternative mechanisms may be present depending on the particular mission of the UA 100. For completion of the given mission, the UA 100 may be controlled autonomously or remotely, such as in piloted flight, as will be described in greater detail.

Figure 1D:
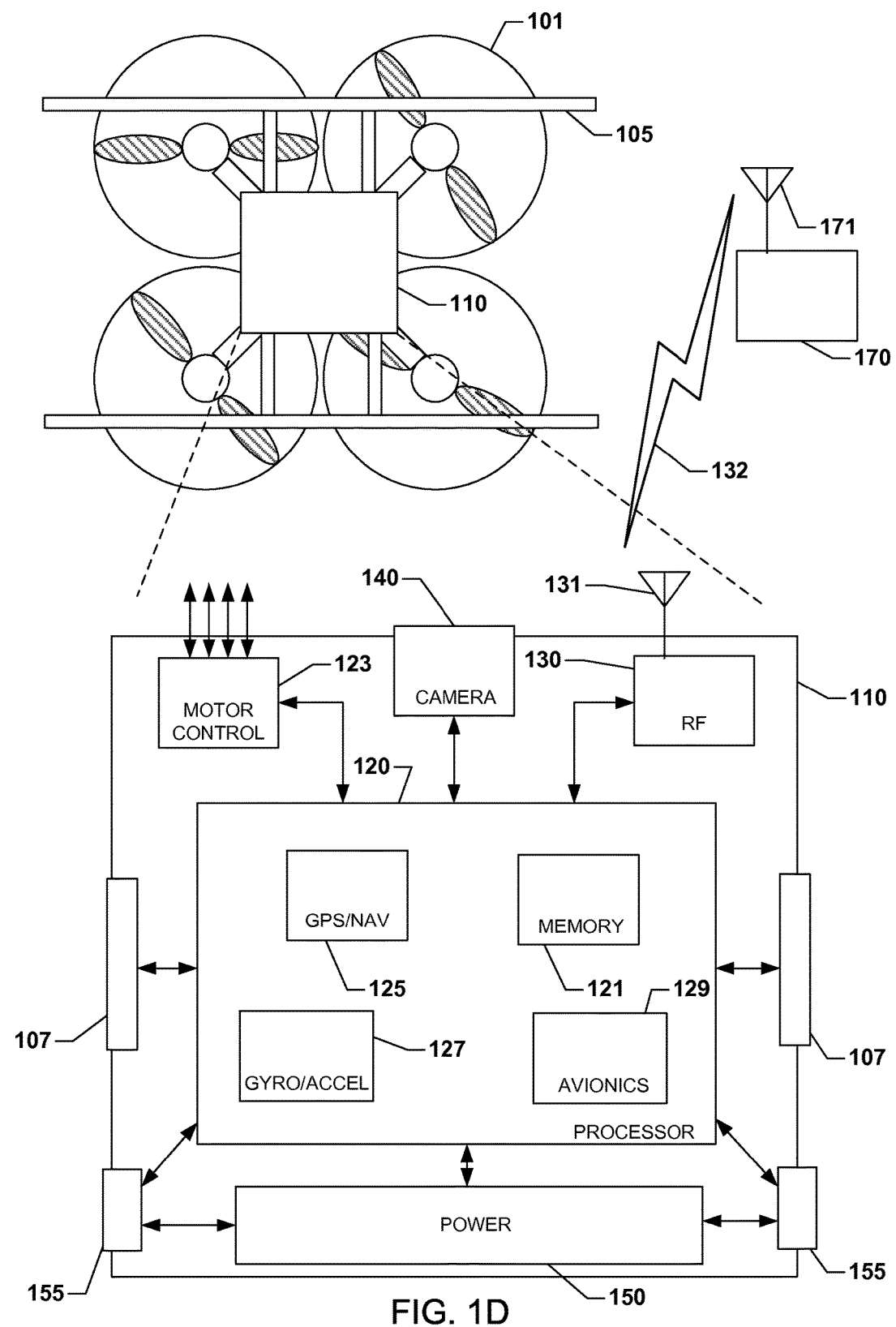
FIG. 1D is a diagram illustrating electrical and electronic components of a typical UA including a wireless communication receiver suitable for use in various embodiments.

An example of a control unit 110 for a UA, such as the UA 100, suitable for use with various embodiments is illustrated in FIG. 1D. With reference to FIGS. 1A-1D, the control unit 110 may include a processor 120, a radio module 130, and a power module 150.

The processor 120 may include or be coupled to a memory unit 121 and a navigation unit 125. The processor 120 may be configured with processor-executable instructions to control flight and other operations the UA 100, including operations of various embodiments. The processor 120 may be configured to conduct autonomous flight of the UA 100. In some embodiments, the processor 120 may be configured to enable or facilitate the piloted flight of the UA 100. For example, the processor 120 may be configured to receive flight commands and provide flight control feedback and/or status. In package delivery mission embodiments, the processor 120 may be coupled to the payload-securing unit 107 and/or the landing sensors 155. In such embodiments, the landing sensors 155 may indicate when the UA 100 has landed, the payload-securing unit 107 can be activated, and the payload 109 can be released.

The processor 120 may be powered from a power module 150, such as a battery. The processor 120 may be configured with processor-executable instructions to control the charging of the power module 150, such as by executing a charging control algorithm using a charge control circuit. Alternatively or additionally, the power module 150 may be configured to manage its own charging. The processor 120 may be coupled to a motor control unit 123 that is configured to manage the motors that drive the rotors 101.

Through control of the individual motors of the rotors 101, the UA 100 may be controlled in flight (e.g., autonomously or pilot controlled) as the UA 100 progresses toward a destination or otherwise travels. The processor 120 may receive data from the navigation unit 125 and use such data in order to determine the present position and orientation of the UA 100, as well as the appropriate course towards the destination. In some embodiments, the navigation unit 125 may include a GNSS receiver system (e.g., one or more GPS receivers) enabling the UA 100 to navigate using GNSS signals.

Alternatively or in addition, the navigation unit 125 may be equipped with radio navigation receivers for receiving navigation beacon or other signals from radio nodes, such as navigation beacons (e.g., very-high frequency (VHF) omnidirectional range (VOR) beacons), Wi-Fi access points, cellular network sites, radio station, etc. Additionally, the processor 120 and/or the navigation unit 125 may be configured to communicate with a server through a wireless connection (e.g., a cellular data network) to receive data useful in navigation as well as provide real-time position reports. In some embodiments, conditions that require the transition from autonomous flight to piloted flight may be determined by the server or a system accessible to the server.

An avionics module 129 coupled to the processor 120 and/or the navigation unit 125 may be configured to provide flight control-related information such as altitude, attitude, airspeed, heading and similar information that the navigation unit 125 may use for navigation purposes, such as dead reckoning between GNSS position updates. The avionics module 129 may include or receive data from a gyro/accelerometer unit 127 that provides data regarding the orientation and accelerations of the UA 100 that may be used in navigation calculations. The flight control-related information may be relayed to a pilot station during piloted flight.

The radio module 130 (also referred to as a "radio frequency (RF) module") may be configured to receive (e.g., via antenna 131) navigation signals, such as beacon signals from restricted areas, signals from aviation navigation facilities, etc., and provide such signals to the processor 120 and/or the navigation unit 125 to assist in UA navigation. In some embodiments, the navigation unit 125 may use signals received from recognizable RF emitters (e.g., AM/FM radio stations, Wi-Fi access points, cellular network base stations, etc.) remote from the UA 100. The locations, unique identifiers, single strengths, frequencies, and other characteristic information of such RF emitters may be stored in a database and used to determine position (e.g., via triangulation and/or trilateration) when RF signals are received by the radio module 130. Such a database of RF emitters may be stored in the memory unit 121 of the UA 100, in a ground-based server in communication with the processor 120 via a wireless communication link, or in a combination of the memory unit 121 and a ground-based server.

Navigating using information about RF emitters may use any of a number of conventional methods. For example, upon receiving an RF signal via the radio module 130, the processor 120 may obtain the signal's unique identifier (e.g., a service sector identification (SSID), a media access control (MAC) address, radio station call sign, cell ID, etc.), and use that information to obtain the ground coordinates and signal strength of the detected RF emitter from the database of RF emitter characteristics. If the database is stored in onboard memory such as the memory unit 121, the processor 120 may use the emitter identifier information to perform a table look up in the database. In some embodiments, the processor 120 may use the radio module 130 to transmit the detected RF emitter identifier to a Location Information Service (LIS) server, which may return a location of the RF emitter obtained an RF emitter location database. Using the RF emitters coordinates and optionally the signal strength characteristics, the processor 120 (or the navigation unit 125) may estimate the location of the UA 100 relative to those coordinates. Using locations of three or more RF emitters detected by the radio module 130, the processor may determine a more precise location via trilateration. Estimates of location based on received ground-based RF emitters may be combined with position information from a GNSS receiver to provide more precise and reliable location estimates than achievable with either method alone.

The processor 120 may use the radio module 130 to conduct wireless communications with a variety of wireless communication devices 170 such as a beacon, a server, smartphone, tablet, or other remote device with which the UA 100 may be in communication. In various embodiments, the processor 120 may establish communication with a control system, such as a gateway/server/central node to facilitate operations, including the offering of missions to pilots and the relay of commands and control feedback once a pilot is selected. A bi-directional wireless communication link 132 may be established between transmit/receive antenna 131 of the radio module 130 and transmit/receive antenna 171 of the wireless communication device 170. For example, in some embodiments, the wireless communication device 170 may be an access node for a control system as described herein.

In some embodiments, the wireless communication device 170 may be a pilot station for controlling the UA 100 in piloted flight as described herein. In some embodiments, the wireless communication device 170 may be a cellular network base station or cell tower that provides a direct or indirect connection to a control system and/or a pilot station. The radio module 130 may be configured to support multiple connections with different wireless communication devices 170 having different radio access technologies.

In some embodiments, the wireless communication device 170 may be connected to a server or provides access to a server. In some embodiments, the wireless communication device 170 may be a server of a UA operator, a server of a control system operator, a third party service (e.g., package delivery, billing, etc.), or a pilot station. The UA 100 may communicate with a server through an intermediate communication link such as one or more network nodes or other communication devices.

In some embodiments, the radio module 130 may be configured to switch between a wireless wide area network connection and a Wi-Fi connection depending on the location and altitude of the UA 100. For example, while in flight at an altitude designated for UA traffic, the radio module 130 may communicate with a cellular infrastructure in order to maintain communications with a control system or server. An example of a flight altitude for the UA 100 may be at around 400 feet or less, such as may be designated by a government authority (e.g., FAA) for UA flight traffic. At this altitude, it may be difficult to establish communication with some of the wireless communication devices 170 using short-range radio communication links (e.g., Wi-Fi). Therefore, communications with other wireless communication devices 170 may be established using cellular telephone networks (or other suitable communication networks, such as satellite communication networks) while the UA 100 is at flight altitude. Communication between the radio module 130 and the wireless communication device 170 may transition to a short-range communication link (e.g., Wi-Fi, Bluetooth, and/or the like) when the UA 100 moves closer to the wireless communication device 170.

In some embodiments, the wireless communication device 170 may be associated with an area in which UA operations are prohibited or restricted, referred to generally as a "restricted area." For example, the wireless communication device 170 may be a beacon device that emits a navigation signal identifying or indicating the restricted area. As another example, the wireless communication device 170 may be wireless access point or cellular network base station coupled to a server associated with the restricted area. The server may use the wireless communication device 170 to communicate with the UA 100 when the UA 100 is in or near the restricted area, or send coordinates of the restricted area to the UA 100 through a data connection established with the UA 100 (e.g., through a cellular data connection maintained by the UA 100 with a cellular network). In such cases, the presence of the UA 100 in a restricted area or required flight through the restricted area may be included as one of the conditions for which piloted flight is necessitated. For example, the operator of the UA 100 may decide that the conditions of the restricted area, such as an airport with active flight operations, may necessitate a pilot for the UA 100. In other examples, the operator of the restricted area may, as a condition of entry into the restricted area, require piloted flight for the UA 100.

In some embodiments, the wireless communication device 170 may also be a server associated with the operator of the UA 100, which communicates with the UA 100, directly, through a local access node or through a data connection maintained through a cellular connection.

While the various components of the control unit 110 are illustrated in FIG. 1D as separate components, some or all of the components (e.g., the processor 120, the motor control unit 123, the radio module 130, and other units) may be integrated together in a single device or module, such as a system-on-chip module.

Figure 1E:
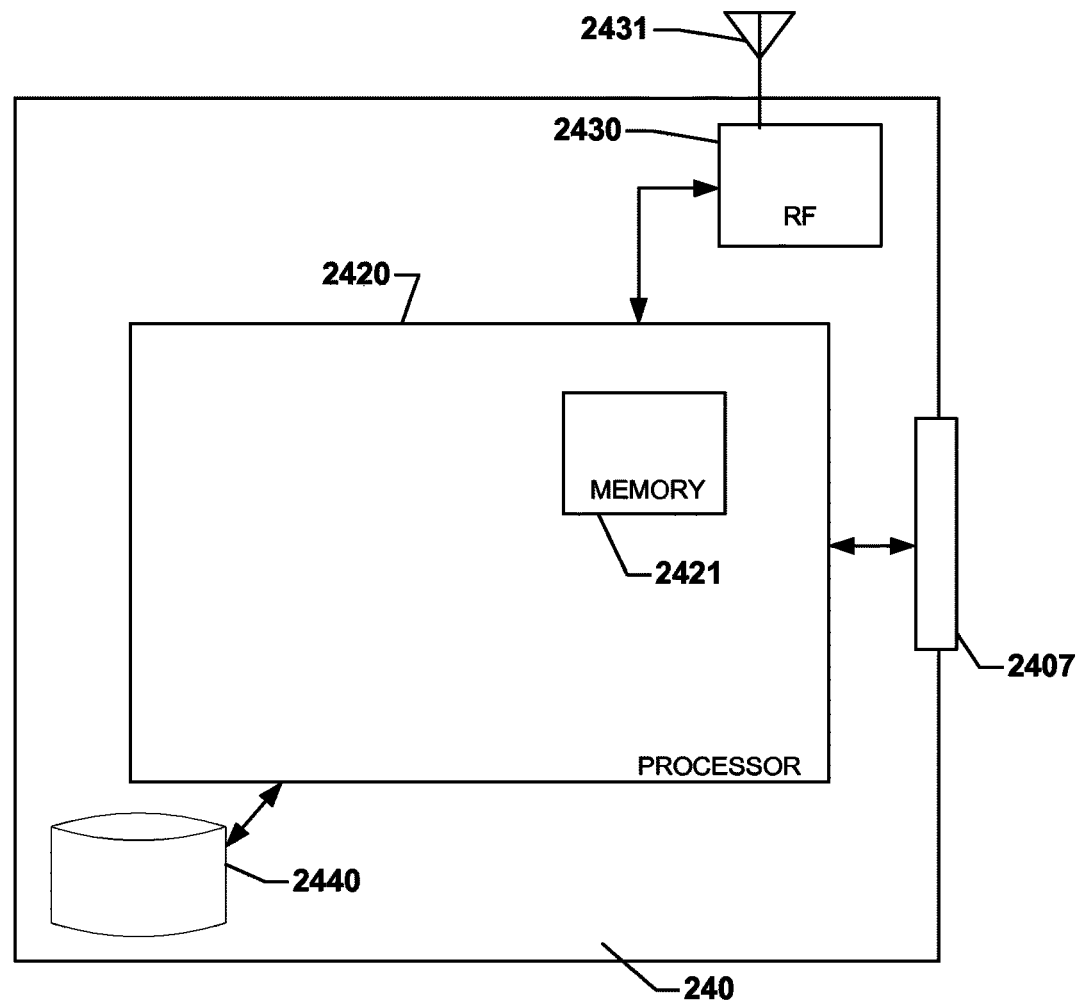
FIG. 1E is a diagram illustrating electrical and electronic components of a server suitable for use in various embodiments.

An example of a server 240 that may be used for managing a transition from autonomous flight to pilot controlled flight of a UA (or from piloted flight to piloted flight with a different pilot) suitable for use with various embodiments is illustrated in FIG. 1E.

With reference to FIGS. 1A-1E, the server 240 may include a processor 2420, which may be configured with processor-executable instructions to perform operations for communicating with a UA, such as the UA 100, and managing the transition of the UA from autonomous flight to pilot controlled flight or from pilot controlled flight to pilot controlled flight with a new pilot. The processor 2420 may be configured with a memory 2421 capable of storing instructions and/or data. The memory 2421 may be an internal or external memory. The memory may be a volatile or non-volatile memory or a combination thereof. The server 240 may further include a secondary storage element 2440, such as a hard disk drive or a series of hard disk drives. Alternatively or additionally, the secondary storage element 2440 may include optical drives, electronic drives, or other types of storage elements or mass storage elements. The secondary storage element 2440 may be controlled by a memory controller (not shown).

The server 240 may include a radio module 2430 (also referred to as a "radio frequency (RF) module") for communicating with UAs via wireless communications. The radio module 2430 may be configured to transmit and receive (e.g., via antenna 2431) communication signals for exchanging data and control commands with the UA 100 or other wireless communication nodes. While FIG. 1E illustrates the radio module 2430 as a component within the server 240, the radio module 2430 may be a separate component coupled to the server 240 via a network or cable (not shown), such as a radio positioned on a building or transmission tower. In In some embodiments, the server 240 may be configured to communicate directly with the UA 100 using the radio module 2430. In addition to the radio module 2430, the server 240 may communicate over a network (e.g., the Internet and/or a cellular data network) using a network connection 2407, which may be one or a combination of wired, fiber optic, cable, or other wired connection. For example, the server 240 may communicate with the UA 100 using a radio module 2430 when the UA is within reception range of the radio's signals, and via cellular data connections, such as an Internet connection carried over a cellular data network, when the UA is located far from the server 240.

Figure 2A:
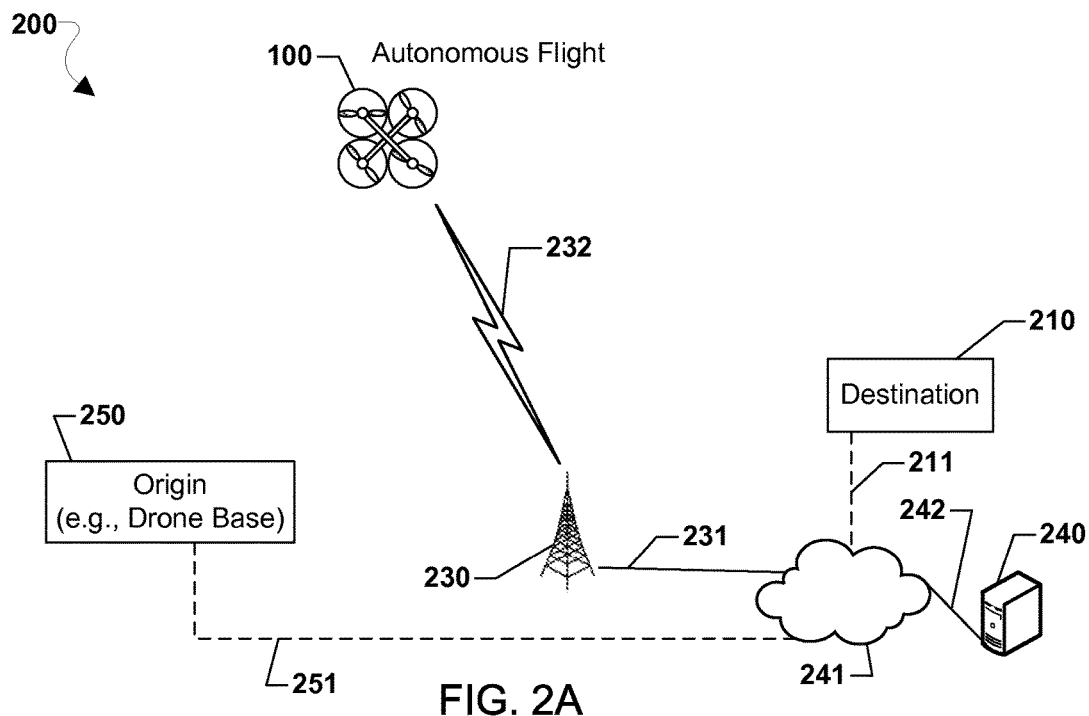
FIG. 2A is a diagram illustrating an example in which a UA is in autonomous flight with a communication link to a control system suitable for use in various embodiments.

An operating environment 200 for a UA, such as the UA 100 in FIGS. 1A-1D, may include a destination 210 and an origin, such as a UA base 250 as illustrated in FIG. 2A. With reference to FIGS. 1A-2A, the UA base 250 may be a "home" location for the UA 100, such as a distribution center or central operations facility. In additional or alternative embodiments, the UA base 250 may be any predetermined or designated starting point for a transit by the UA 100 (e.g., including a previous "destination"). The UA base 250 may also be a predetermined or designated area to which the UA 100 may be configured to return. The coordinates of the destination 210 may be provided to the UA 100 by a server 240 (e.g., wireless communication device 170). In some embodiments, the UA 100 may be programmed with the coordinates of its destination 210, such as when the UA 100 is assigned for a mission or while the UA 100 is in flight. In some embodiments, the destination 210 may be coordinates of a loiter location where the UA 100 may proceed to and/or maintain monitoring or other operations within the area of the destination 210.

The UA 100 may establish and maintain communication with the server 240, such as while the UA 100 is at the UA base 250 to facilitate the dispatch of the UA 100 to the destination 210. In various embodiments, the UA 100 may establish a direct connection 251 with the server 240 while at the UA base 250 and/or may communicate with the server 240 through a network connection. For example, the UA 100 may establish a wireless connection 232 with a cellular infrastructure component 230 of a cellular service provider. The wireless connection 232 may be a data connection that provides a connection with the server 240 through a public network, such as the Internet 241 and connections 231 and 242, while the UA 100 is on the ground and/or in flight. The UA 100 may establish multiple wireless connections simultaneously, such as the wireless connection 232 and additionally or alternatively, a wireless connection with a wireless access point or access points along the route. The wireless access points may provide independent connections to the Internet 241 through which the UA processor, such as the processor 120, may access the server 240. In some embodiments, the destination 210 may also include a connection 211 to the Internet 241, through which communications with the server 240 may be established.

In various embodiments, the UA 100 may receive information regarding the destination 210 from a control system, such as the server 240. In some embodiments the mission, including the destination 210, may be preplanned and downloaded or uploaded to the UA 100. For example, the mission may be planned by a human or may be planned by a device, such as the server 240 or other server. The UA 100 may be dispatched from the UA base 250 to fly autonomously to the destination 210. Alternatively or additionally the destination 210 may be substituted for a mission that involves performing an operation or operations and returning the UA base 250. The UA 100 may proceed according to the planned route. Alternatively or additionally, the UA 100 may autonomously determine the route to the destination 210, and/or the mission route, based on various constraints, such as ground safety considerations, altitude restrictions, obstacles (e.g., buildings, mountains, towers, etc.), weather conditions, retrievability considerations, efficiencies (e.g., most fuel efficient route, shortest distances to travel), and the need to avoid restricted areas. During autonomous flight, the UA 100 may make adjustments to the route. As will be described in greater detail, the various conditions and/or changes in the conditions may give rise to the need for piloted flight.

During autonomous flight, in the event that the UA 100 lands or crashes while traveling to or from its destination, in some embodiments, the UA 100 may be configured to do so in an area that will be least likely to cause safety issues to humans or damage to property, and/or in an area where the UA 100 (and/or the payload 109) can be most easily retrieved, and so on. The UA 100 may use GNSS signals from GNSS satellites (or any other suitable method) to determine progress toward the destination 210, current position with regard to the mission plan or flight plan, including progress towards waypoints defining the planned flight path of the UA 100.

During autonomous flight, the UA 100 may establish the wireless connection 232 with the cellular infrastructure component 230 to facilitate communications with the control system, such as the server 240, through the Internet 241 while in flight. In various embodiments, the UA 100 may use information from the server 240 to obtain condition updates, communicate current position, mission progress, etc. In some embodiments, the UA 100 may receive information regarding flight conditions that may give rise to the need for piloted flight. In other embodiments, the UA 100 may determine the need for piloted flight.

Figure 2B:
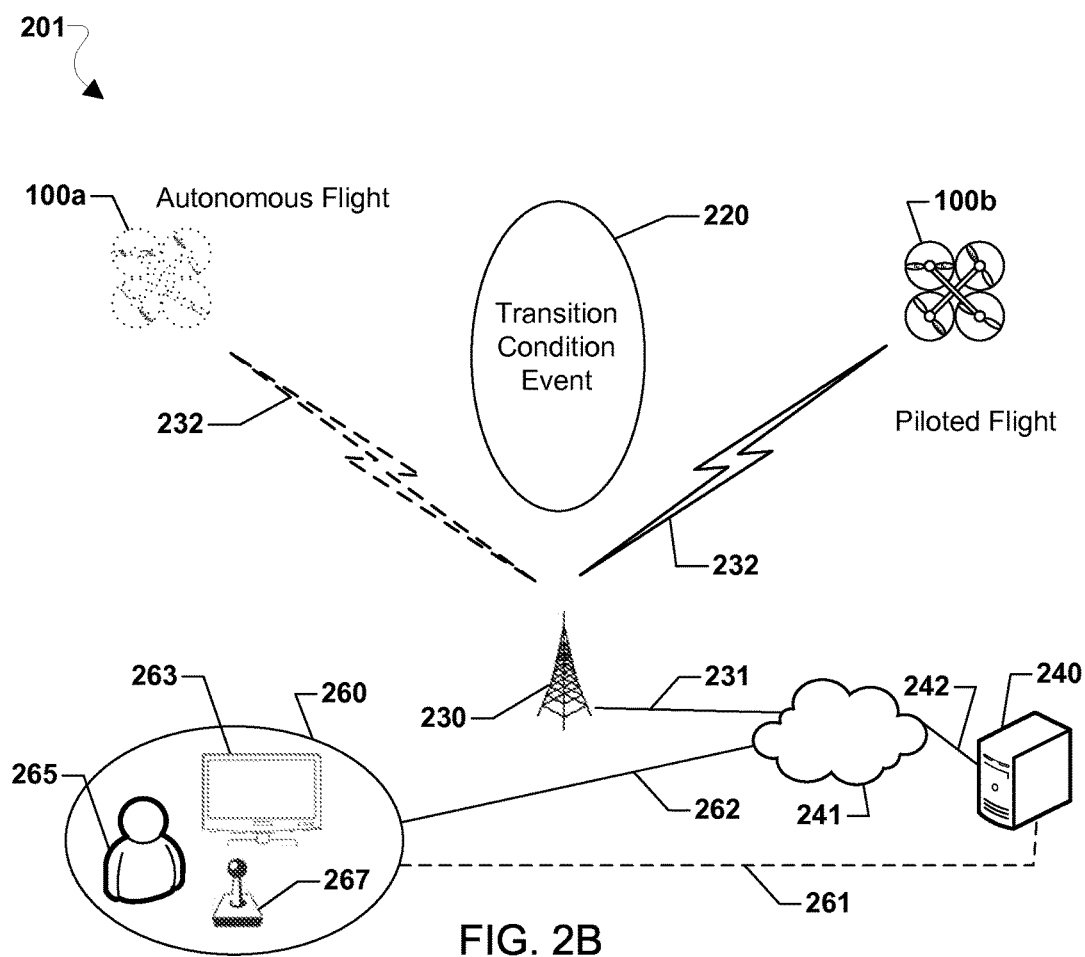
FIG. 2B is a diagram illustrating an example in which a UA transitions from autonomous flight to piloted flight based on a transition condition in various embodiments.

In some embodiments, such as in environment 201 illustrated in FIG. 2B, a UA 100*a* (which may correspond to the UA 100 in FIGS. 1-2A) may be proceeding in autonomous flight. With reference to FIGS. 1A-2B, the UA 100*a* may periodically or continuously monitor conditions by monitoring communication with the server 240 through the wireless connection 232. The UA 100*a* may be configured to periodically check the functioning of the navigation unit 125 and/or communication links with the server 240. For example, the UA 100*a* may receive periodic communications from the server 240 indicating that the wireless connection 232 is still maintained and viable. In some embodiments, the UA 100*a* may send periodic communications to the server 240 providing the location coordinates of the UA 100*a* and/or indicating that the navigation unit 125 and other UA systems are still functioning. If the processor 120 of the UA 100*a* determines that the navigation unit 125 and other UA systems are not functioning, corrective action may be taken. For example, in the event that the UA 100*a* loses contact with the GNSS satellites 235, and the UA 100*a* has no other way to determine location, the UA 100*a* may issue an alert to the server 240 and land.

The UA 100*a* may determine that a transition condition event 220 has occurred based on monitored conditions and/or conditions received from the server 240. For example, the UA 100*a* may determine that an event that requires a transition from autonomous flight to piloted flight. When a transition condition event 220 is detected, the UA 100*a* may transition to piloted flight shown as UA 100*b*. The transition condition event 220, may be (but not limited to) a weather event, a mission event, a flight system event (e.g., malfunction), etc. Other examples of transition conditions events may include, but are not limited to, a geographic condition (e.g., approaching a mountain), a visibility condition (e.g., fog), a UA mechanical condition (e.g., engine/motor failure), a UA instrument condition (e.g., loss of altimeter), a communication link quality condition (e.g., creating control/feedback latency), a mission requirement condition, an emergency condition (e.g., fire), a triggering request from the server 240 or other device, and so on. In addition, the type and/or characteristics of the UA may be considered as a condition for the pilot criteria.

In piloted flight, the UA 100*b* may be directed in flight by a pilot station 260. The pilot station 260 may include a pilot 265, a pilot control 267, and a pilot display 263. In some embodiments, the pilot station 260 may be coupled to the control system, such as the server 240, through the Internet 241, through connections 262 and 242. In some embodiments, the pilot station 260 may be connected to the server 240 directly. In some embodiments, the server 240 may function as a local node in a control network that provide a relay function of commands and feedback between the pilot station 260 and the UA 100*b*. In some embodiments, the connections 261, 262, and 242 and other network connections between the pilot station 260 and the UA 100*b*, may be secure connections in order to protect against tampering and hijacking. In other embodiments, the UA 100*b* may be in direct communication with the pilot station 260.

Figure 2C:
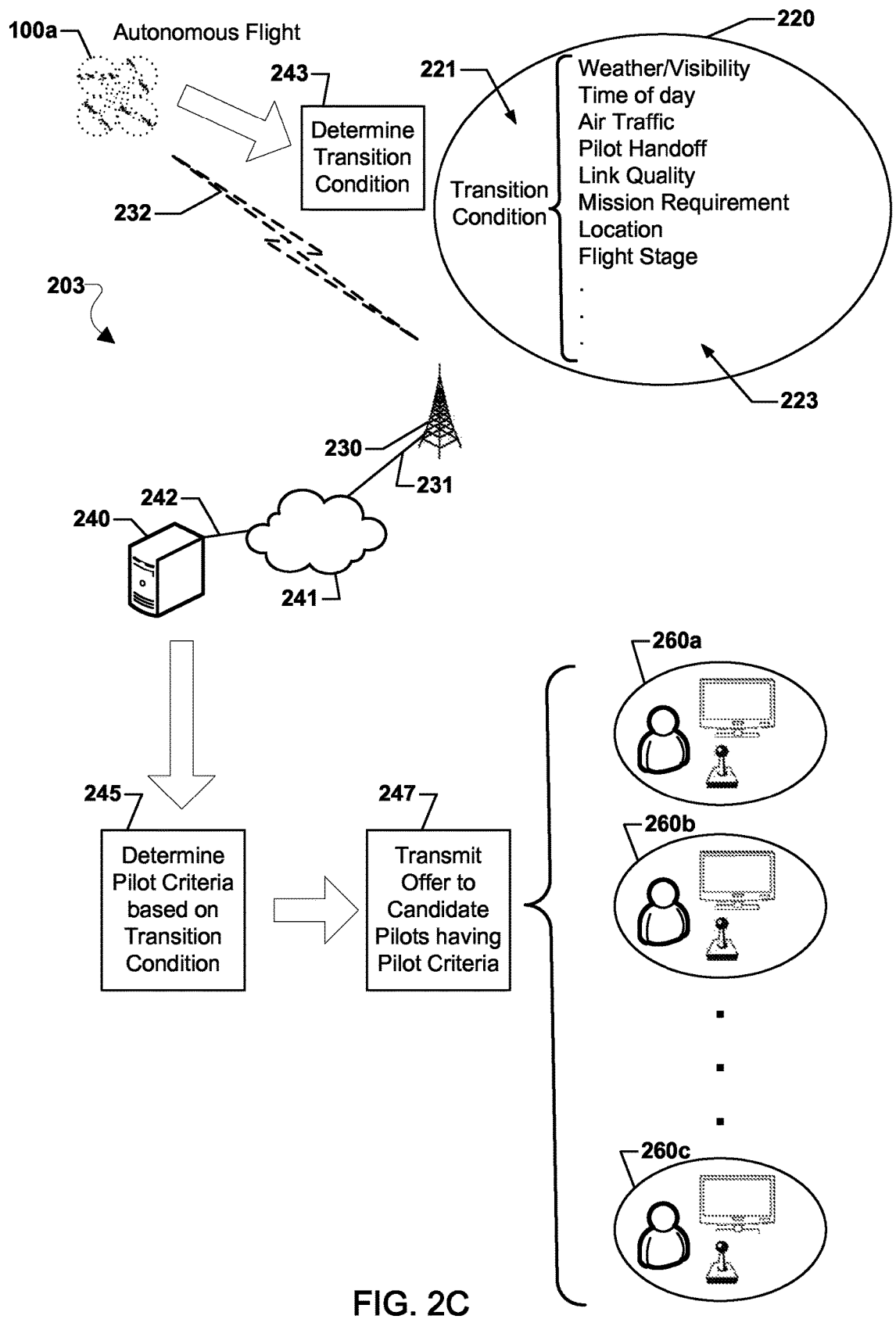
FIG. 2C is a diagram illustrating an example in which, based on a transition condition, a control system offers a pilot mission to pilots satisfying pilot criteria in various embodiments.

In some embodiments, such as in an environment 203 as illustrated in FIG. 2C, the UA 100*a* may encounter conditions while in autonomous flight that may give rise to the need to transition to piloted flight. With reference to FIGS. 1A-2C, during autonomous flight, the processor 120 of the UA 100*a* may receive input from various sensors including weather sensors (e.g., wind speed, wind direction, barometric pressure, etc.), flight attitude sensors, weather radar, system condition sensors, or other sensors. Alternatively or additionally, the UA 100*a* may receive condition information from the control system, such as the server 240. For example, the UA 100*a* may receive information from the sensors that corresponds to a transition condition 221 from among conditions 223 that may be associated with the transition condition event 220. The conditions 223 may include, but are not limited to, weather and/or visibility, time of day, level of air traffic, pilot handoff (pilot rest, etc.), link quality, specific mission requirements, current location, flight stage (e.g., landing, takeoff, approach, etc.), and so on.

The transition condition 221 may indicate an impending one of the transition condition event 220 that may require piloted flight. For example, the UA 100*a* may determine that a condition 223, such as a time of day condition, indicates that a transition condition 221 (e.g., sunset) is approaching. Assuming that the UA 110*a* is not configured to fly autonomously at night, the transition condition 221 corresponding to night flight may require piloted flight. In various embodiments, in order to perform operations such as managing the detection of a transition condition and the transition from autonomous to piloted flight, the UA 100*a* may remain connected to the control system, such as the server 240, through the Internet 241. The connection may be facilitated by the wireless connection 232 to the cellular infrastructure component 230 and the connections 231 and 242. In some embodiments, the connection may be maintained in other ways, such as connections facilitated by other access mechanisms including private radio networks, public or private access points, etc., or a combination thereof.

In various embodiments, the server 240, the UA 100a, or a combination of the server 240 and the UA 100a may determine the transition condition 221 in block 243. When the transition condition 221 is determined, the server 240, the UA 110a, or a combination of the server 240 and the UA 100a, may determine pilot criteria for selecting a pilot for piloted flight under the current or anticipated conditions in block 245. For example, if the transition condition 221 relates to a particular severe weather event, the pilot criteria may include a level of experience (e.g., 500 hours overall) successfully piloting UAs in the given weather event. If a particular level experience is identified as a pilot selection criterion for piloting the UA 100a in the given weather condition (e.g., 10 hours with the specific condition, 500 hours overall), the level of experience with the given condition may be included in the pilot criteria. If a particular rating (e.g., instrument rating) is required or appropriate to successfully pilot the transition condition 221, the pilot criteria may include the rating. Other pilot criteria may include, but are not limited to, an overall length of pilot experience (e.g., hours); a length of pilot experience associated with the condition (e.g., 25 hours wind shear); a length of pilot experience associated with the UA (e.g., the UA for the mission, similar UA or class of UA); a pilot physical condition; a pilot mental condition; a pilot flight recency (e.g., last fight within 8 hours); a pilot affiliation; a pilot qualification (e.g., instrument rating, etc.); a pilot certification status (including a medical certification and/or a flight certification); a pilot ready status; a pilot incident history; a pilot crash history; a pilot availability status; a location of the pilot; a quality of a network connection of the pilot (pilot station); and so on.

In some embodiments, elements of the control system may provide and evaluate weighting for various ones of the factors described or other factors. Assuming that the pilot candidates are certified, pilot license certification status may alternatively or additionally be used as a factor. Typically, a pilot's license includes a pilot certificate and a medical certificate that indicate a pilot's flight certification status and medical certification status. Thus, in some embodiments, the type and/or status of the medical certificate (e.g., the medical certification status of the pilot) may be evaluated and weighted as a factor. Further, the type and/or status of the pilot certificate (e.g., the flight certification status of the pilot) may be evaluated and weighed.

For example, the control system may weigh the pilot's medical certificate status, which may be based on a medical examination performed by a qualified medical examiner. The medical examination may take into account the physical condition of the pilot including physical limitations, such as shaking hands, poor night vision, poor mental condition, and so on.

In the United States, medical certificates may be issued by classes. A Third Class Medical Certificate is necessary to exercise the privileges of a private, recreational, student, or flight instructor pilot license or certificate and expires after sixty calendar months for pilots under the age of forty, or twenty four calendar months for pilots over the age of forty. The Third Class Medical Certificate requires that the following medical criteria be met: Distant vision: 20/40 or better in each eye separately, with or without correction; Near vision: 20/40 or better in each eye separately, with or without correction, as measured at a distance of 16 inches (410 mm); Color vision: Demonstrate the ability to perceive the colors necessary for the safe performance of airman duties; Hearing: Demonstrate the ability to hear an average conversational voice in a quiet room, using both ears, at a distance of six feet, with their back turned to the examiner, or pass an approved audiometric test; Ear, Nose, and Throat: Exhibit no ear disease or condition manifested by, or that may reasonably be expected to be manifested by, vertigo or a disturbance of speech or equilibrium; Blood Pressure: Under 155/95; Mental Status: No diagnosis of psychosis, bipolar disorder, or severe personality disorders; Substance Dependence: No dependence on alcohol or any pharmacological substance in the previous two years.

A Second Class Medical Certificate is necessary in the U.S. to exercise the privileges of a commercial pilot license or certificate and expires after 12 calendar months. The Second Class Medical Certificate requires that the following criteria be met: Distant vision: must be 20/20 or better in each eye separately, with or without correction; Intermediate vision: must be 20/40 or better in each eye separately, with or without correction, at age 50 and over, as measured at 32 inches.

A First Class Medical Certificate is necessary in the U.S. to exercise the privileges of an airline transport pilot license or certificate and expires 1) after 12 calendar months for pilots under the age of forty, or 6 calendar months for pilots over the age of forty for those operations requiring a First-Class Medical Certificate; 2) after 12 calendar months regardless of age for those operations requiring only a Second-Class Medical Certificate; or 3) after 24 or 60 calendar months, depending on other rules, for those operations requiring only a Third-Class Medical Certificate. The First Class Medical Certificate requires that the following medical criteria be met: Heart Function: Electrocardiogram must show normal heart function once at age 35 and annually for those age 40 and over.

Pilots who fail to meet medical certificate criteria may nevertheless be issued a medical certificate under a "special issuance" status. Thus, in various embodiments, pilots who have medical certificates that are under "special issuance" status may be evaluated based on the nature of the special issuance condition. Further, based on certain physical deficiencies, medical certificates may have restrictions, such as a requirement to wear corrective lenses for vision impaired pilots, a restriction against night flight, or a restriction for color blind pilots against flying aircraft that use color signal controls. Thus, in various embodiments, any restrictions on the medical certification status may be noted and used in weighting the pilot for suitability for a UA mission.

In addition to medical certificate status, the pilot experience with various conditions (e.g. lightning, mountainous terrain, over-water flight, over-city flight, etc.) may be taken into consideration and weighted. The control system may weight pilot UA experience levels. For example, a pilot experience weight may be associated with or derived for experience with all UA types, with the current UA in need of a pilot for a mission, and with UAs of a similar type to the UA in need of a pilot for a mission.

The control system, such as the server 240, may determine or learn of a determination of the transition condition 221 that requires piloted flight, and based on the criteria, present an offer for the piloting mission to one or more pilots who are on duty or otherwise available to take over piloting the UA. In block 247, the server 240 may transmit an offer for piloting the UA 100a to one or more pilot stations 260a, 260b, and 260c, one or more of which correspond to the pilot station 260. The control system, such as the server 240, may also determine whether the pilot stations 260a, 260b, and 260c possess the functionality or qualifications that satisfy the pilot criteria and can handle the transition condition 221 of the transition condition event 220.

In some embodiments, the pilot stations 260a, 260b, and 260c may register with a service (e.g., associated with the control system) from which they will receive the offers for piloting missions. In connection with registering with the service, the pilot stations 260a, 260b, and 260c may provide the experience levels and qualifications of the corresponding pilots. The pilot stations 260a, 260b, and 260c may further register their pilot station functionality (e.g., software modules, software versions, etc.), performance (e.g., connection speed, processing speed, display resolution, etc.) and hardware capabilities (e.g., control device characteristics, control input speed, button configuration, etc.), or other capabilities that may be pertinent to the pilot criteria.

Figure 2D:
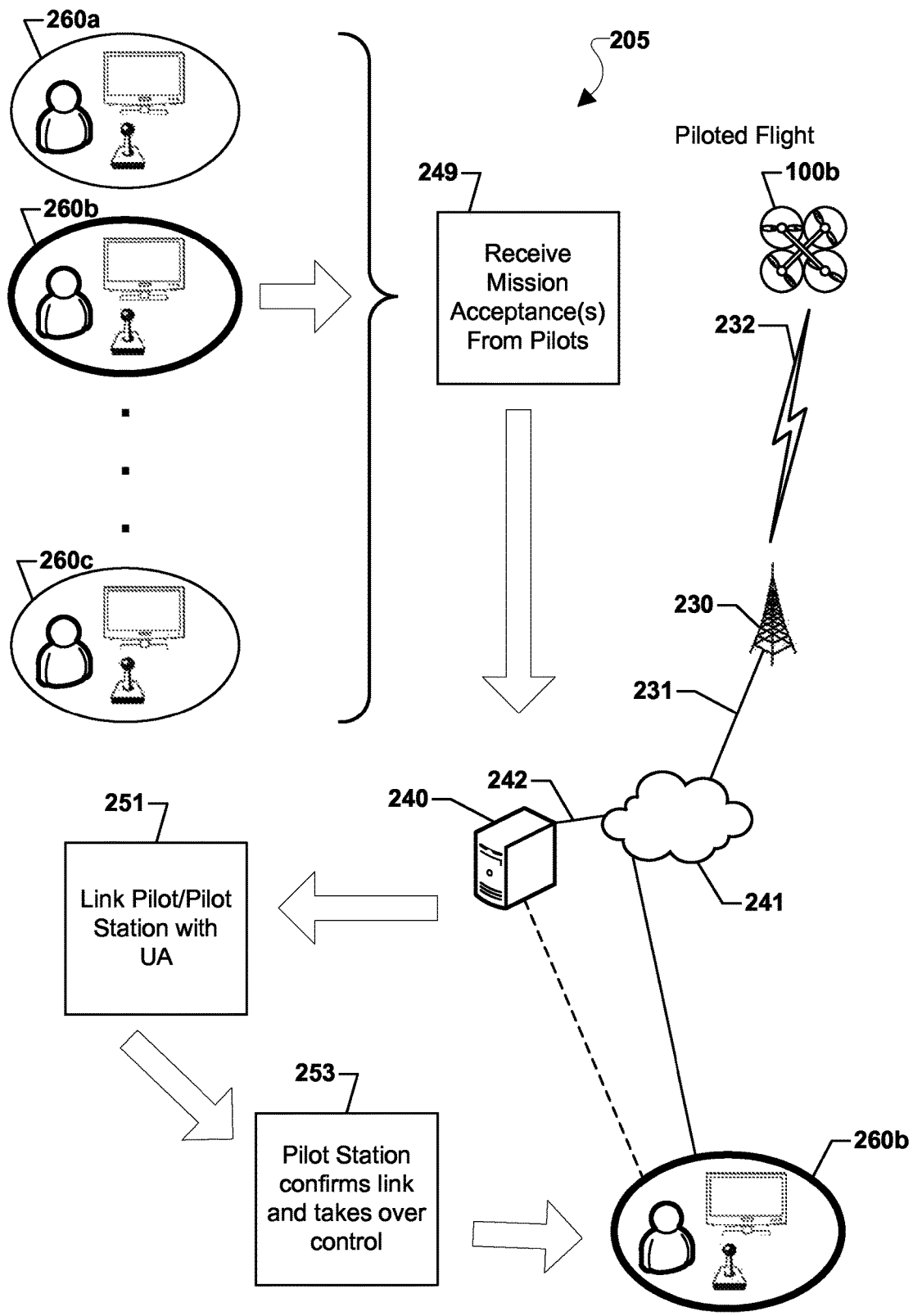
FIG. 2D is a diagram illustrating an example in which a control system receives mission acceptances from one or more pilots to which a UA mission was offered and assigns the mission to an accepting pilot station in various embodiments.

In some embodiments, such as in environment 205 as illustrated in FIG. 2D, the pilot stations 260a, 260b, and 260c may accept missions offered by the server 240. With reference to FIGS. 1A-2D, one or more of the pilot stations 260a, 260b, and 260c may accept an offer from the server 240 for piloting the UA 100a that was made based on the transition condition 221 and pilot criteria associated with the detected condition. In block 249, the control system, such as the server 240, may receive the mission acceptance from the pilot station 260b. In the illustrated example, the pilot station 260b has accepted the offer. In other embodiments, when several of the pilot stations accept the mission, the control system may select a single pilot to perform the piloting mission. In such embodiments, the pilot stations that are not selected for the piloting mission may be placed on a "reserve" list. The pilots on the reserve list may be selected in the event that the primary pilot cannot conduct or complete the mission. Further, the pilots on reserve list may withdraw their acceptance of the offer and may be removed from the reserve list.

In block 251, the server 240 may perform operations to link the UA 100b in piloted flight with the pilot station 260b. During the transition from autonomous flight to piloted flight, the UA 100b may continue to perform autonomous flight operations until the pilot station 260b confirms that it has taken over control of the UA 100b. In block 253, the pilot station 260b may confirm that the link is operational and takes over control of the UA 100b. For example, a communication link may be established between the UA 100b and the pilot station 260b, but may require a period of time to confirm that the link is operational. Such a confirmation may include confirming that pilot controls are received by the UA 100b and that flight information from the UA 100b is received by the pilot station 260b. When the link is operational, the pilot station 260b may perform a confirmation operation, such as an exchange of messages to confirm that the pilot station 260b has taken over control of the UA 100b.

Figure 3A:
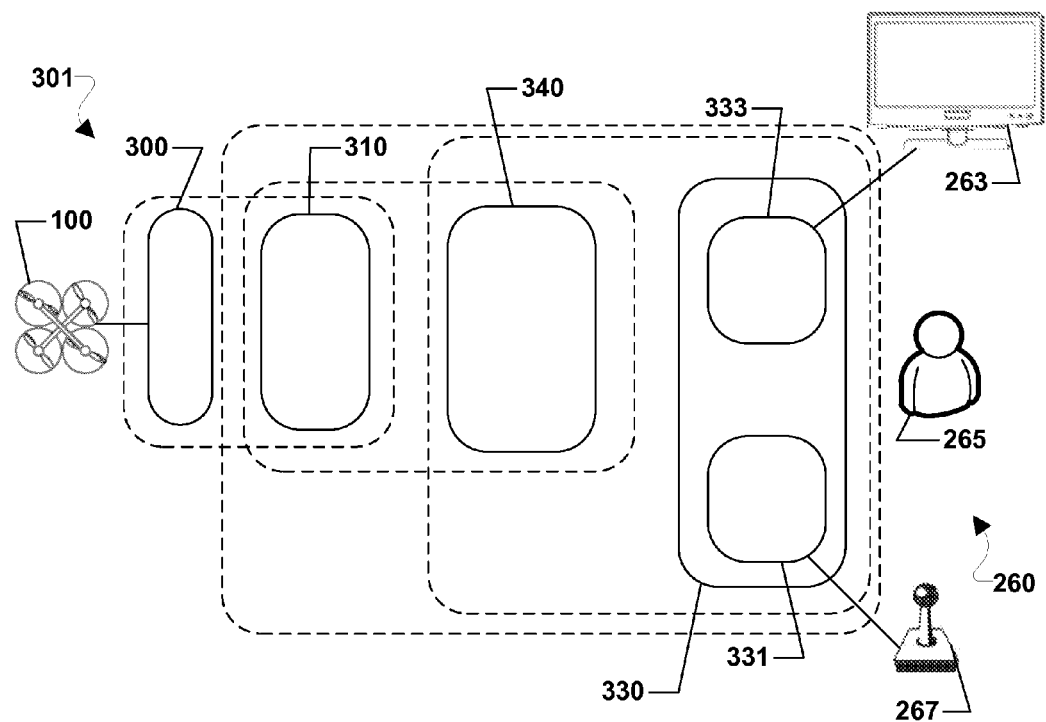
FIGS. 3A and 3B are diagrams illustrating UA, pilot station, and control system components in various embodiments.

FIG. 3A illustrates an environment 301 that includes a configuration of client and control system modules for performing control and mission offer operations. With reference to FIGS. 1A-3A, the UA 100 (e.g., 100a) may be coupled to a UA module 300, which may be a low level hardware module that may include embedded fight instrument and control systems. In some embodiments, the UA module 300 may be coupled to and reside in the UA 100. In some embodiments, the UA module 300 may reside externally to the UA 100. The UA module 300 may include embedded software modules that are responsible for providing and/or applying signals for controlling flight motors or other flight controls, UA systems, and other controls or instruments. The UA module 300 may also be responsible for collecting feedback regarding the status of the flight controls. For example, the UA module 300 may apply signals to control the flight altitude of the UA 100, and may collect altimeter readings.

The UA module 300 may be logically coupled to a UA client module 310. In some embodiments, the UA client module 310 may be coupled to and reside in the UA 100. In some embodiments, the UA client module 310 may reside externally to the UA 100. In some embodiments, the UA client module 310 may be a higher level software module relative to the UA module 300. The UA client module 310 may be responsible for communications with external systems and relaying information between the UA 100 and a pilot station, such as the pilot station 260.

The UA client module 310 may be logically coupled to a control system module 340. In some embodiments, the control system module 340 may be coupled to and reside in the UA 100. In some embodiments, the control system module 340 may reside externally to the UA 100. The control system module 340 may control various operations in various embodiments. For example, the control system module 340 may facilitate the detection of conditions leading to the need or advisability of transitioning from autonomous flight to piloted flight. The control system module 340 may facilitate the offering of piloted flight missions to candidate pilot stations. The control system module 340 may facilitate accepting offers from a pilot station or stations and selecting a pilot for the mission. The control system module 340 may facilitate establishing links with the UA 100 and the pilot station 260. Once a link is established, the control system module 340 may facilitate relaying flight control data from the pilot station 260 to the UA 100. The control system module 340 may facilitate relaying flight status and/or feedback from the UA 100 to the pilot station 260.

The control system module 340 may be logically connected to the pilot station 260, such as through a pilot data module 331 and a pilot display module 333. In some embodiments, the pilot data module 331 and the pilot display module 333 may be jointly coupled to or within a pilot station module 330. The pilot station module 330 may be coupled to the control system module 340, such as through a network connection. The pilot station module 330 may be hardware that enables the operation of the pilot station 260. In some embodiments, the pilot station module 330 may be a computing device, such as a work station, operation station, personal computer, or other computing device or devices. The pilot data module 331 may be coupled to the pilot control 267. The pilot control 267 may include a flight control device such as a control yoke, a joystick, or similar control device. The pilot control 267 may translate pilot inputs into control signals to which the UA 100 in flight can respond, such as controlling the flight motors or other control systems or surfaces (ailerons, etc.). The pilot control 267 may include additional controls such as buttons, sliders, or other controls that may operate additional UA systems such as cameras, package release mechanisms, or other systems.

The pilot display module 333 may provide a display of the flight condition of the UA 100. For example, in some embodiments, the pilot display module 333 may provide a view of the flight conditions, such as provided by an on-board camera (e.g., 140 of FIG. 1D), as if the pilot was actually within the UA 100. In other embodiments, the pilot display module 333 may provide a view of the flight conditions of the UA 100 sufficient to enable a pilot 265 associated with the pilot station 260 to fly the UA 100 under the current flight conditions.

In various embodiments, the quality of the pilot display module 333 may be driven primarily by the quality of the image capturing capability of the UA 100. In some embodiments, the UA 100 may provide a series of camera views from a series of on-board cameras. In such embodiments, the pilot display module 333 may select a particular view that best suits the needs of the pilot 265. In some embodiments, the control system module 340 may collect the multiple camera feeds and provide one of the feeds to the pilot display module 333, such as based on a selection or request made by the pilot 265. In other embodiments, control system module 340 may provide all of the camera feeds to the pilot display module 333 and the pilot may have access to all or a subset of the camera feeds. The pilot display module 333 may also be configured to enable the pilot 265 to perform a local zoom. In some embodiments, the pilot controls 267 may allow the pilot 265 to control a zoom of the onboard cameras.

The various modules described herein may reside in various physical components or distributed among the various physical components as shown by the dotted lines in the environment 301. Communication between the various modules may be through communication connections such as wireless and/or wired communication connections or may be through data connections such as data busses or connections when the modules reside on the same hardware.

Figure 3B:
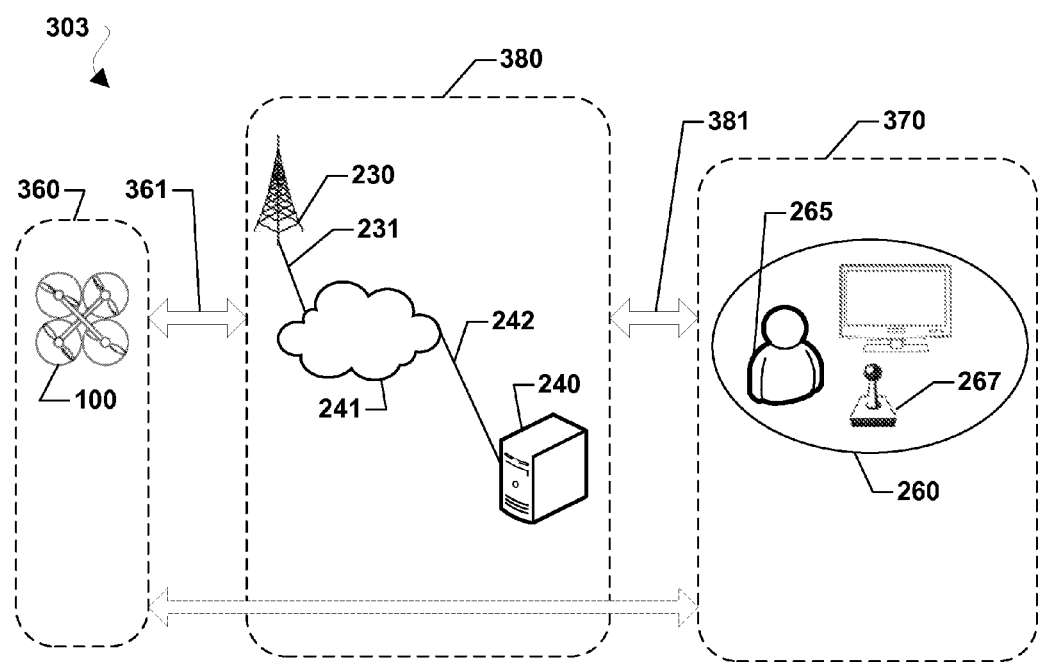

Example relationships between physical components in an environment 303 are illustrated in FIG. 3B. With reference to FIGS. 1A-3B, the modules may be located exclusively within various hardware groups or may be distributed between various hardware groups or components. For example, some or all of the UA modules 300 and the UA client module 310 may reside in a hardware group 360, which may include the hardware of the UA 100. For example, in some embodiments, the UA modules 300 may reside on the UA 100 and the UA client module 310 may also reside on the UA 100. In some embodiments, all or part of the UA client module 310 may be located external to the UA 100. Some or all of the UA client module 310, and the control system module 340, and some or all of the modules related to the pilot station 260 may reside in a hardware group 380. In some embodiments, the hardware group 380 may include only the control system module 340. The hardware group 380 may include the server 240, and communication hardware and connections with the server 240, such as the cellular infrastructure component 230, the Internet 241 and the connections 231 and 242. Some or all of the pilot data module 331 and the pilot display module 333 may reside in a hardware group 370. The hardware groups may interoperate through connections 361 and 381, which may be wireless and/or wired connections as described.

Figure 3C:
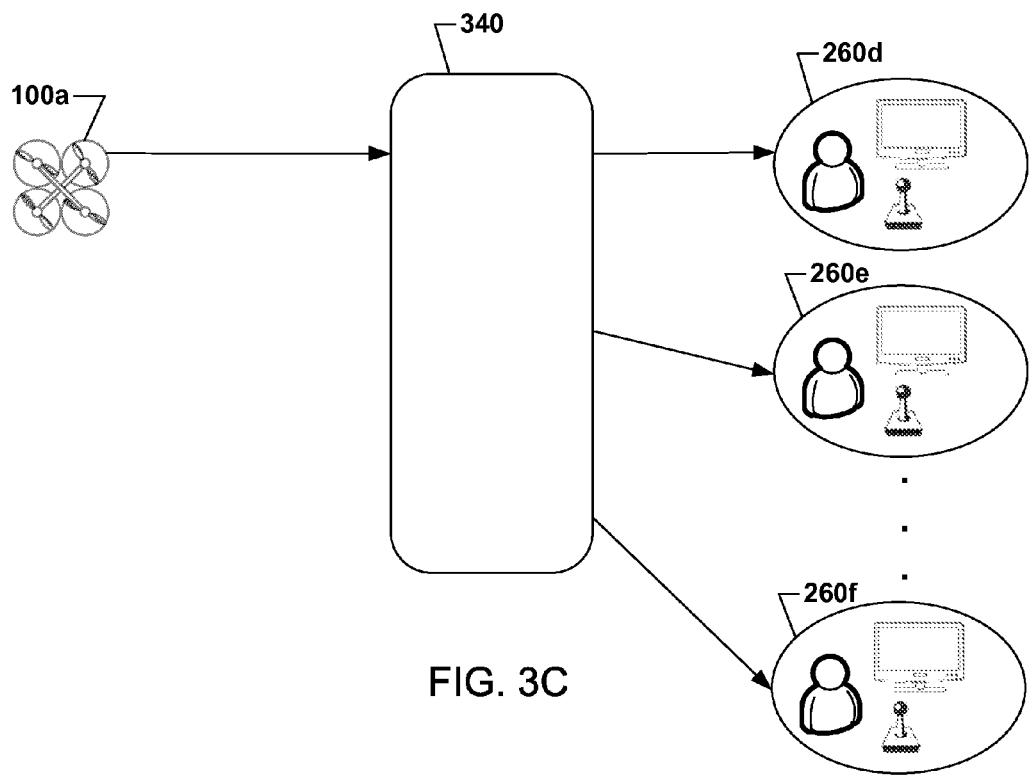
FIG. 3C is a diagram illustrating a UA mission being offered to pilot stations in various embodiments.

In various embodiments, the control system module 340 may provide piloted flight mission offers for the UA 100a to a variety of candidate pilot stations 260d, 260e, and 260f as illustrated in FIG. 3C. With reference to FIGS. 1A-3C, such offers for the piloted flight mission may be made when the UA 100a transitions to piloted flight (UA 100b) and/or when the UA is already in piloted flight. For example, an offer may be made to one or more pilots when a pilot in control of a UA has reached a maximum authorized piloting time, when the pilot's experience level does not match a newly detected transition condition, or when other situations arise. In some embodiments, a pilot may accept the mission offer conditioned on a particular mission time. In some embodiments, the pilot may accept a mission segment, which may include performing the mission until the transition condition has abated (e.g., weather event cleared).

Figure 3D:
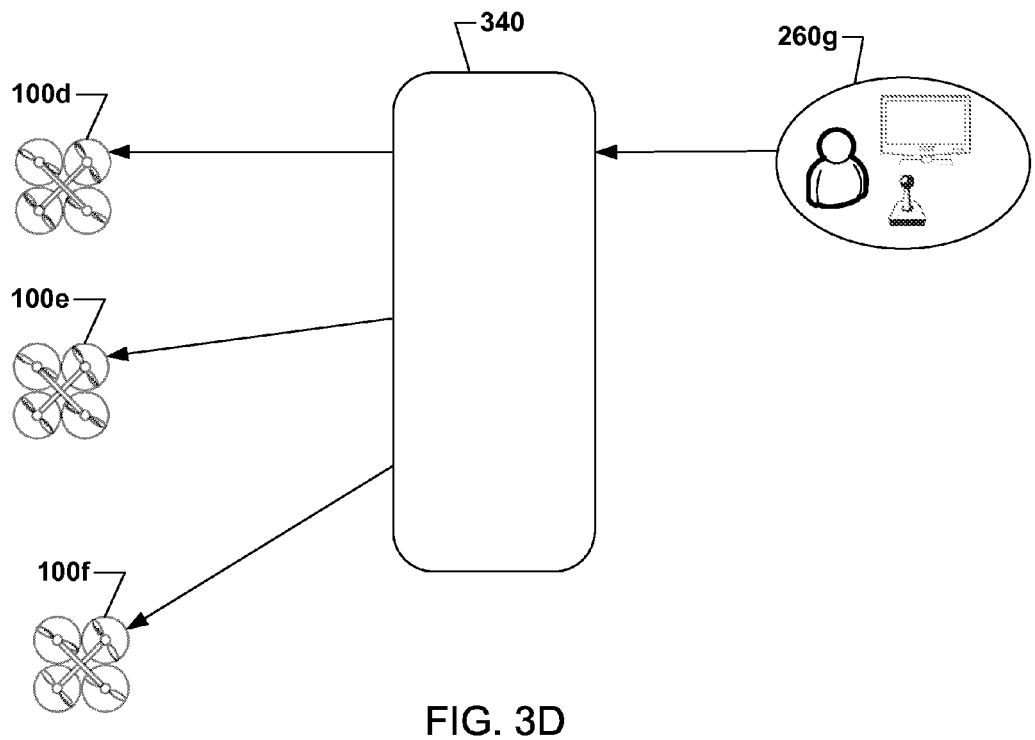
FIG. 3D is a diagram illustrating a UA mission being offered to UAs in various alternative embodiments.

In some embodiments, the control system module 340 may be configured to offer a mission or select from among a series of UAs 100d, 100e, 100f (one or more of which may correspond to UA 100, 100a/100b in FIGS. 1-3C) as illustrated in FIG. 3D. With reference to FIGS. 1A-3D, A pilot station 260g (which may correspond to the pilot station 260 (260a-260c)) may provide a request to the control system module 340 for a UA to complete a given mission. The request may include criteria for the UA to be able to complete the mission. For example, the mission may require a UA with infrared imaging capability. The control system module 340 may provide the mission offer to the UAs 100d, 100e, 100f. The operators of the UAs 100d, 100e, 100f may accept the mission. The control system module 340 may select from among the UAs 100d, 100e, 100f whose operators accepted the mission. Alternatively, the UAs 100d, 100e, 100f may be configured to evaluate their own availability status and automatically accept a mission.

Figure 4A:
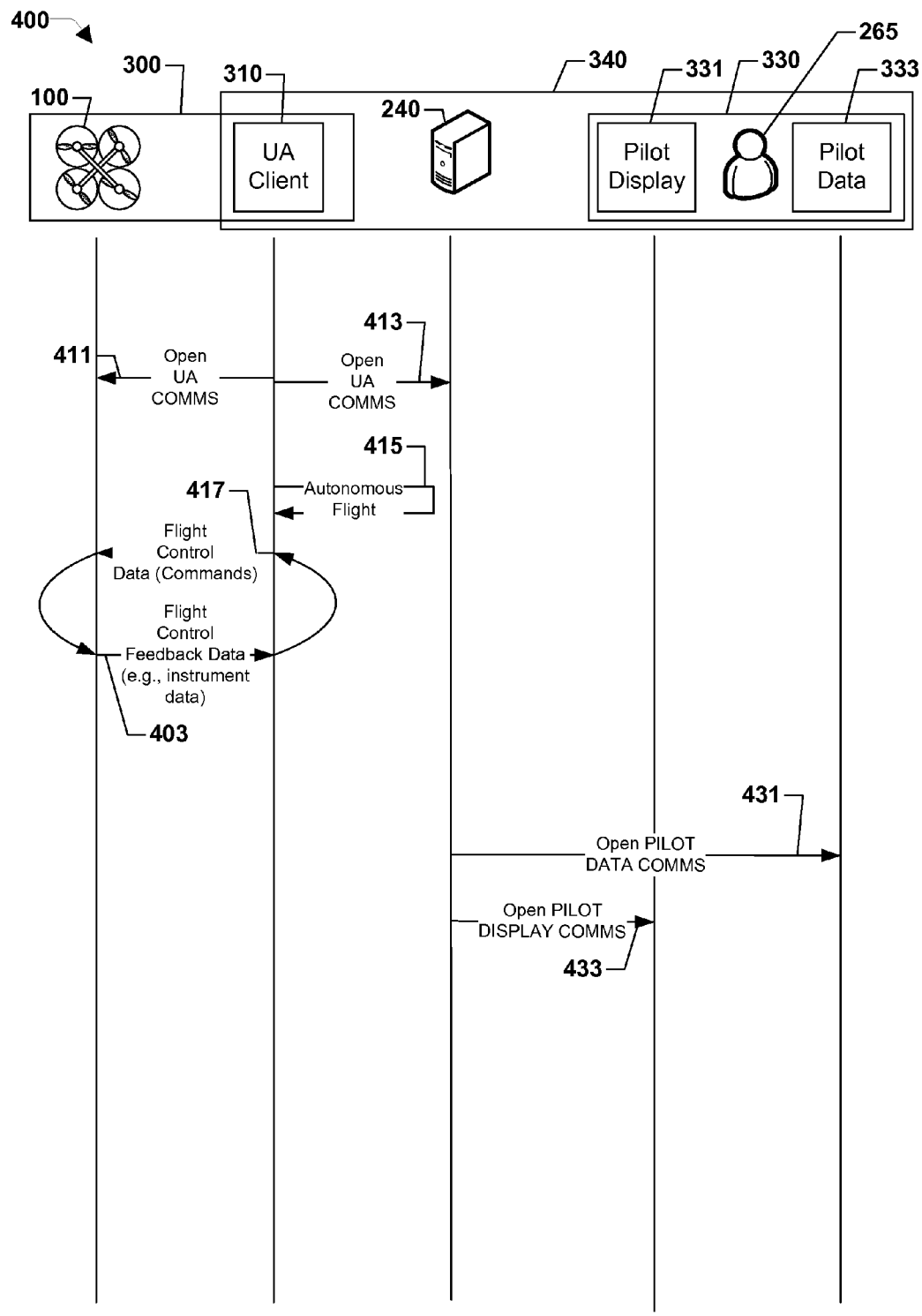
FIGS. 4A-FIG. 4C are message flow diagrams illustrating messages exchanged between components of a UA distributed control system in various embodiments.

FIG. 4A illustrates message flows 400 that may be implemented in various embodiments during flight. With reference to FIGS. 1A-4A, messages may be exchanged between components of a mission control system including a UA (e.g., 100, 100a-100g), a server (e.g., 240), a UA client (e.g., 310), a control system module (e.g., 340), and a pilot station module (e.g., 330) including a pilot display module (e.g., 331) and a pilot data module (e.g., 333) according to various embodiments. Before operations may commence, the UA client module 310 may open a communication connection with the UA 100, such as with the UA module 300, by transmitting a message 411. The UA client module 310 may also open a communication connection with the control system module 340, such as with the server 240 by transmitting a message 413.

The UA client module 310 may proceed in autonomous flight by a signal or operation 415. The UA client module 310 may transmit flight control data, such as commands for controlling flight of the UA 100 by transmitting a message 417 (or messages) to the UA 100. The messages 417 may be received by the UA 100 and implemented to achieve a flight condition associated with the flight control data, such as implementing a command or commands. The UA 100 may transmit flight control feedback, which may include instrument data, image data, and/or other data by transmitting a message 403 (or messages) to the UA client module 310. The messages 417 and 403 may continue to be exchanged during autonomous flight of the UA 100.

In various embodiments, the control system module 340, such as through the server 240, may open a communication connection with the pilot data module 331 by sending a message 431 (or messages). The control system module 340 may further open a communication connection with the pilot display module 333 by sending a message 433 (or messages). By opening the various connections the control system module 340 may be configured to conduct communications with the UA 100 and the pilot station 260.

Figure 4B:
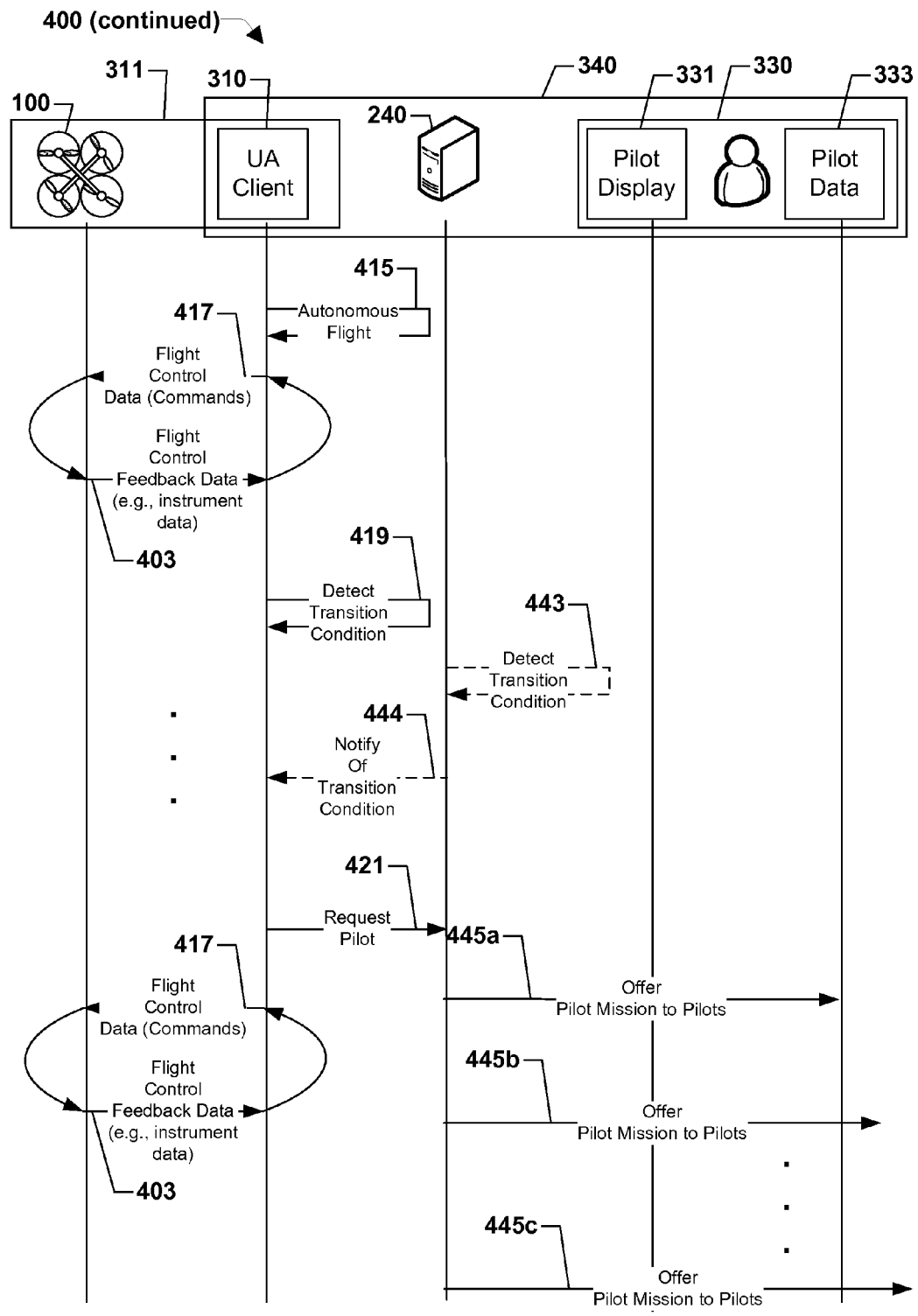

FIG. 4B illustrates message flows between components of a mission control system for determining transition condition and offering piloting missions in various embodiments. With reference to FIGS. 1A-4B, the UA 100 in autonomous flight may detect a transition condition 419. Alternatively or additionally, the server 240 may detect a transition condition 443 and may notify the UA client module 310 by sending a message 444. In response to detecting the transition condition or being notified of the transition condition, the UA client module 310 may request a pilot for the detected transition condition by sending a message 421. The message 421 may include pilot criteria sufficient to address the detected transition condition.

In response to receiving the message 421, the control system module 340 may offer a piloting mission to various pilot stations by transmitting messages 445a, 445b, and 445c. The control system module 340 may send additional messages depending on the number of pilots meeting the pilot criteria. In some embodiments, the control system module 340 may consult a list of pilots/pilot stations along with the pilot qualifications for pilots that have registered to receive offers.

Figure 4C:
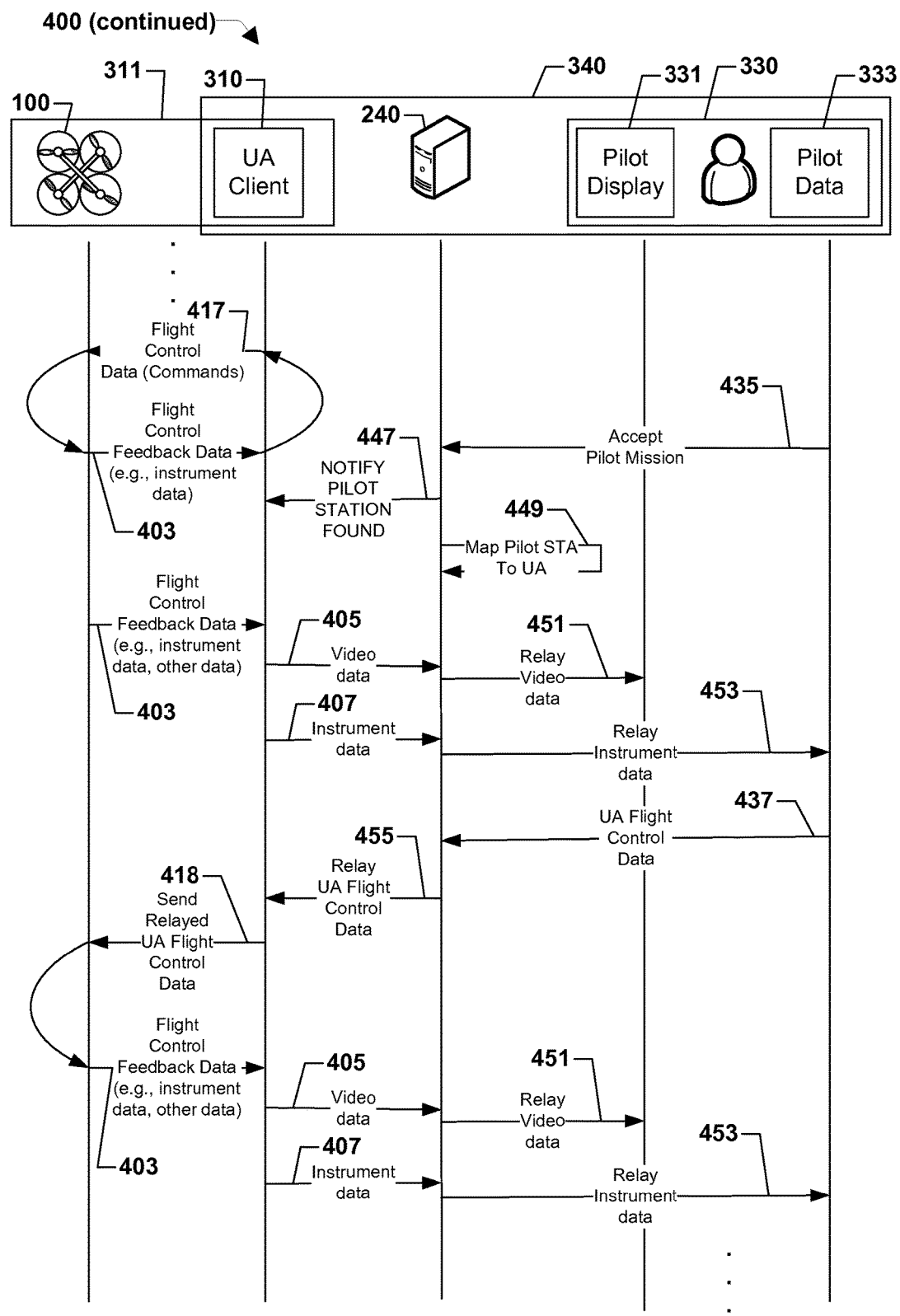

FIG. 4C illustrates further message flows between components of a mission control system for selecting pilots from among pilots that have accepting piloting missions in various embodiments. In the illustrated embodiments, for ease of description, it is assumed that the pilot station accepted and was selected by the control module based on possessing the necessary qualifications to perform the piloting mission. With reference to FIGS. 1A-4C, the pilot data module 331 may accept the piloting mission offer by transmitting a message 435 to the control system module 340. The control system module 340, such as through the server 240, may notify the UA client module 310 that a pilot has been found by transmitting a message 447 to the UA client module 310. While the offer, acceptance, and selection processes are being conducted, the UA 100 may proceed in autonomous flight (e.g., continuing its original route or loitering) or land until piloted flight can be established. In connection with transmitting the message 447, the control system module 340 may map 449 the pilot station to the UA 100, which may include linking the UA 100 and the pilot station module 330, including the pilot data module 331 and the pilot display module 333.

In response to receiving the notification that the pilot is found, the UA client module 310 may transmit the flight control feedback data to the pilot station by sending video data messages 405 and instrument data messages 407. In some embodiments, the instrument data and video data may be provided in different messages because the data rate of the messages may be different. For example, the video data may be generated continuously. The instrument data may be generated less frequently. In some embodiments, video and instrument data of the UA 100 may be transmitted to the pilot station in a single message, series of messages, or a data feed or feeds. In response to receiving the video data message 405, the control system module 340 through the server 240 may transmit a message 451 relaying the video data feed to the pilot display module 333. In response to receiving the instrument data message 407, the control system module 340 may transmit a message 453 through the server 240 relaying the instrument data feed to the pilot data module 331.

During piloted flight operations, the pilot 265 may interact with the pilot control 267 and generate flight control data, such as flight commands. The pilot data module 331 may transmit the flight control data, such as the flight commands to the control system module 340 by transmitting a message 437 to the server 240. The control system module 340 may relay the flight control data to the UA 100 by transmitting a message 455 to the UA client module 310. In response to receiving the message 455, the UA client module 310 may relay the flight control data to the UA 100 by transmitting a message 418. The UA 100 may receive the flight control data, implement the associated control commands and generate flight control feedback data reflecting changes in flight attitude resulting from implementing the control commands. As discussed above, the flight control feedback data may include instrument data and video data. The UA 100 may transmit the flight control feedback data by transmitting the message 403 to the UA client module 310. As described, the flight control feedback data may be relayed to the pilot station through the UA client module 310 and the control system module 340 by transmitting the messages 405, 407, 451, 453, where the cycle of receiving and applying flight control data (e.g., control commands) and generating and transmitting the flight control feedback data may be continued during piloted flight.

Figure 5A:
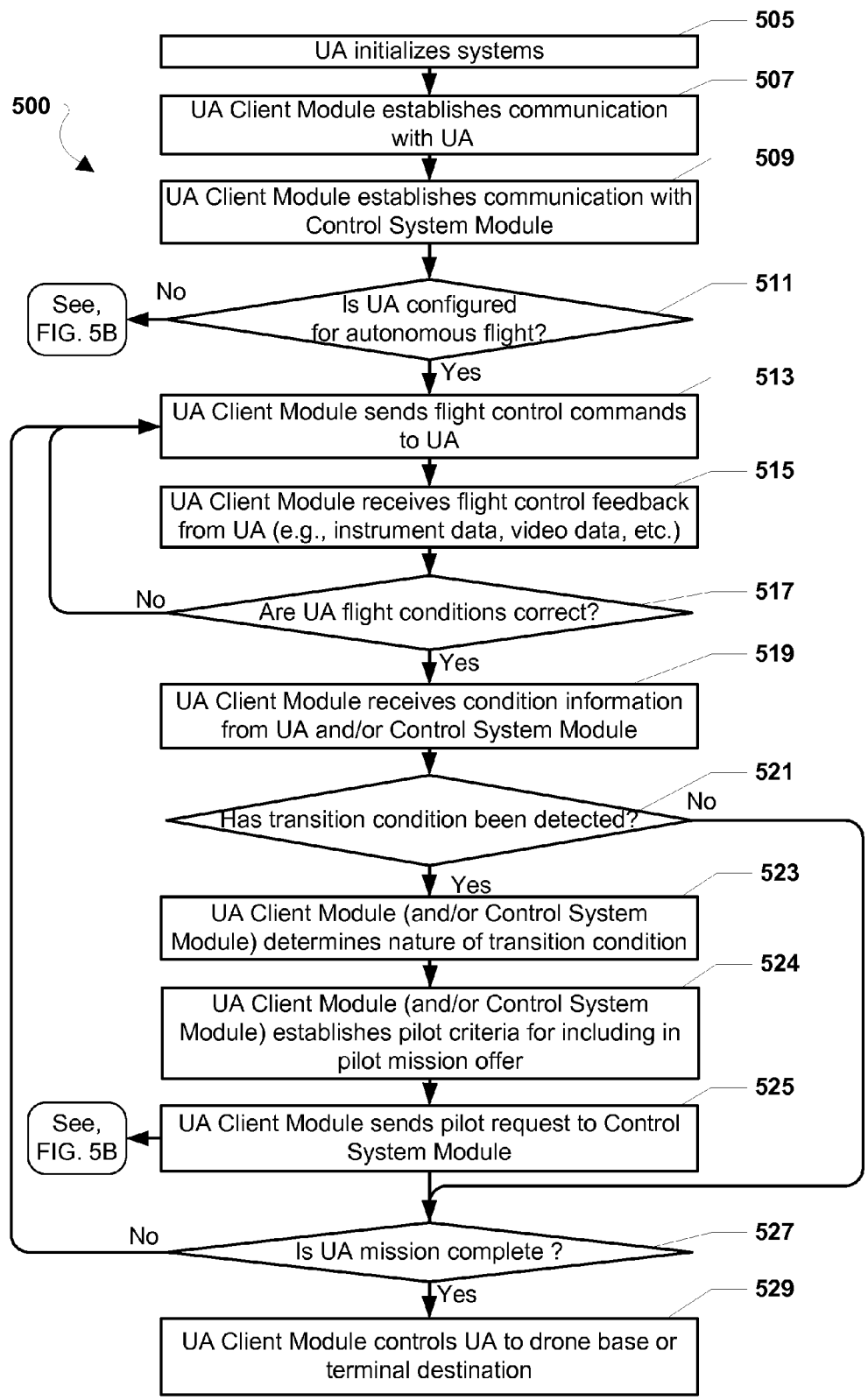
FIG. 5A is a process flow diagram illustrating a method for transitioning a UA to piloted flight according to various embodiments.

FIG. 5A illustrates a method 500 for transitioning a UA (e.g., 100, 100a-100g in FIGS. 1-4C), to piloted flight according to various embodiments. With reference to FIGS. 1A-5A, to perform the operations of the method 500, the processor (such as the processor 120) of the UA 100 may initialize systems, such as navigation systems in block 505. In block 507, the processor of the UA 100 may execute or initialize a UA client module (e.g., UA client module 310) to establish communication with the hardware of the UA 100 and/or with an embedded client module (e.g., UA module 300). In block 509, the processor may further enable the UA client module to establish communications with the control system module (e.g., control system module 340, server 240). In some embodiments, the processor may enable the UA client to respond to a request from the control system module to establish communications.

In determination block 511, the processor may determine whether the UA is configured for autonomous fight. In response to determining that the UA is configured for autonomous flight (i.e., determination block 511="Yes"), the processor may facilitate the UA client module to conduct autonomous flight (e.g., by sending the appropriate flight control data/commands to the UA) in block 513. Alternatively, the processor may conduct autonomous flight and the UA client module may monitor the autonomous flight and update the control system module. In response to determining that the UA is not configured for autonomous flight (i.e., determination block 511="No"), the processor may perform one or more of the operations in method 501 (e.g., described with reference to FIG. 5B).

In block 515, the processor may facilitate the UA client module in receiving flight control feedback data from the UA, such as directly from the UA systems or from an embedded UA module (e.g., 300). In determination block 517, the processor may determine whether the flight conditions are correct, such as based on the flight control feedback data. In response to determining that the flight conditions are correct (i.e., determination block 517="Yes"), the processor may facilitate the UA client module in receiving condition information (e.g., weather, time, etc.) from UA instruments and/or from the control system module in block 519. In response to determining that the flight conditions are not correct (i.e., determination block 517="No"), the processor may facilitate the UA client module in continuing to send autonomous flight control data commands to the UA in block 513.

In determination block 521, the processor may determine whether a transition condition has been detected. For example, the processor may determine that a severe weather condition necessitating the transition to piloted flight has been detected. In response to determining that a transition condition has been detected (i.e., determination block 521="Yes"), the processor may facilitate the UA client module in determining the nature of the transition condition in block 523. In block 524, the processor may establish the pilot criteria for including in the pilot mission offer. The pilot criteria may include qualifications and/or experience levels that may be necessary to handle the nature of the transition condition. In block 525, the processor may facilitate the UA client module in sending a pilot request to the control system module. For example, in response to determining that a transition condition is detected and the nature of the condition is determined (including the pilot criteria), the UA client module may transmit the request for the pilot along with the pilot criteria necessary for handling the condition. The processor may perform the operations of the method 501 (e.g., described with reference to FIG. 5B) for transitioning to piloted flight.

In response to determining that a transition condition has not been detected (i.e., determination block 521="No"), the processor may determine whether the mission is complete in determination block 527. For example, the processor may determine that a particular destination location, which may include a return to a base station after completion of a mission, may be reached. In other embodiments, the processor may receive some other indication that the mission is complete. In response to determining that the mission is complete (i.e., determination block 527="Yes"), in block 529, the processor may facilitate the UA control module in controlling the flight of the UA back to a drone base or designated terminal destination, which may include the originating location. In response to determining that the mission is not complete (i.e., determination block 527="No"), the processor may facilitate the UA client module in continuing to send flight control data/commands to the UA in block 513.

Figure 5B:
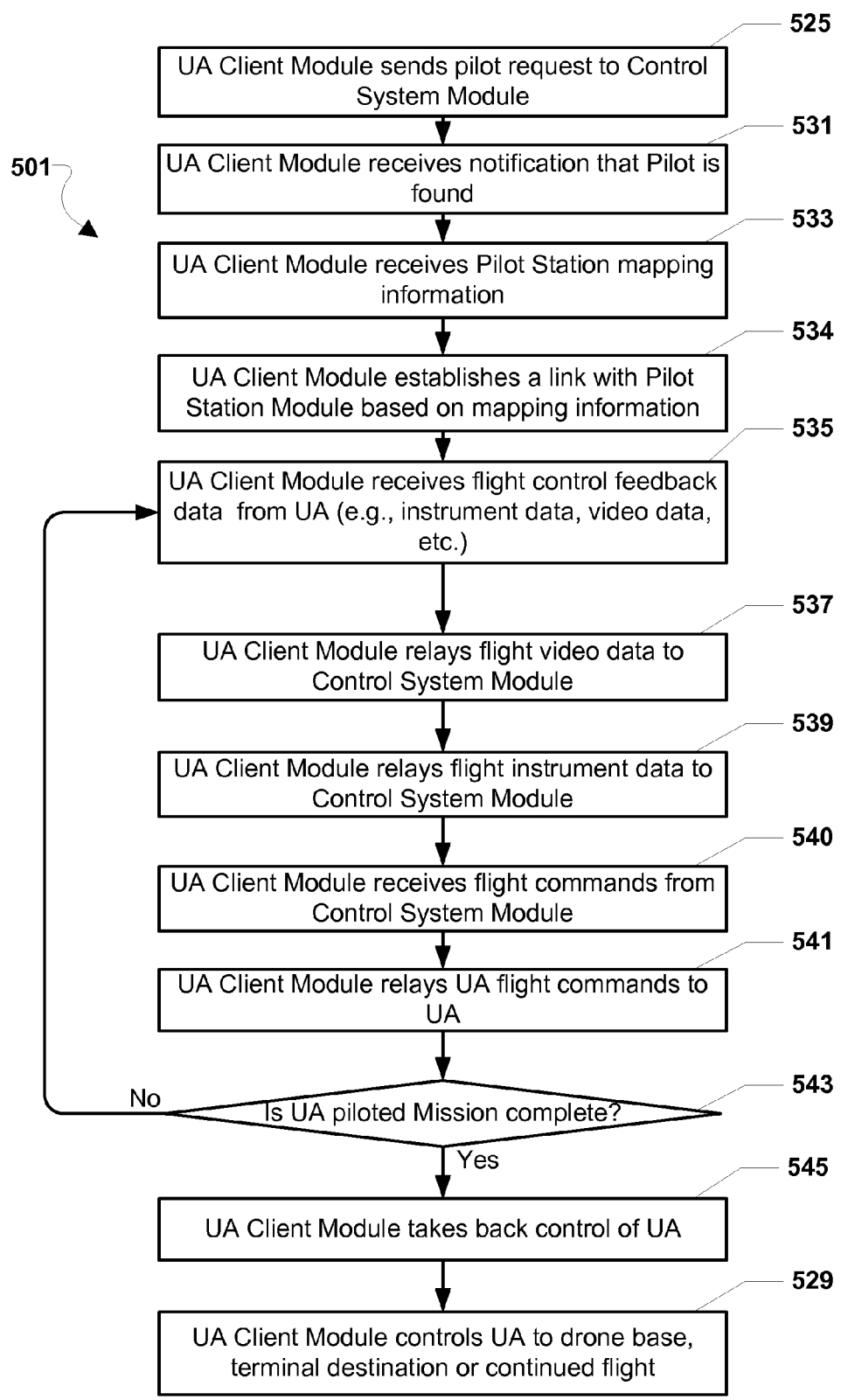
FIG. 5B is a process flow diagram illustrating a method in which a UA is directed in piloted flight according to various embodiments.

The method 501 for transitioning to piloted flight is illustrated in FIG. 5B according to various embodiments. With reference to FIGS. 1A-5B, the processor may facilitate the UA client module in sending a pilot request in block 525. The control system module may process the request, make a pilot offer, receive acceptances, and select a pilot as described in greater detail hereinafter.

In block 531, the processor may facilitate the UA client module in receiving a notification that a pilot has been found. For example, the control system module may send identifying information of the pilot/pilot station for the UA client module to conduct communications. In block 533, the processor may facilitate the UA client module in receiving pilot station mapping information indicating information associated with the pilot station, such as an address, a port identifier, a secure socket identifier, and/or other mapping information.

In block 534, the processor may establish a link with the pilot station based on the mapping information. For example, a link may be established between the UA client module, the control system module, and the pilot station module. As such, communications can be relayed between the UA client module, the control system module, and the pilot station module. As used herein, "establishing a link" may refer to participation in forming a link. For example, the processor of the control system module may manage the establishment of the link by passing mapping information to the UA client module, while having already established a leg of the link with the selected pilot station module. Thus, in establishing a link with the selected pilot station module, the processor of the UA client module may set up a connection based on the selected pilot station mapping information, such as by accepting a connection request sent from the control system module. Once the connection request is accepted, a link may be established between the UA client module and the selected pilot station module.

In block 535, the processor may facilitate the UA client module in receiving flight control feedback data from the UA. The flight control feedback data may include a flight instrument data feed, a flight video data feed, and/or other data from the UA. In block 537, the processor may facilitate the UA client module in relaying the flight video data feed to the control system module. In block 539, the processor may facilitate the UA client module in relaying the flight instrument data feed to the control system module. In block 540, the processor may facilitate the UA client in receiving flight control data, such as flight commands from the control system module. In some embodiments, the control system module may receive the flight control data (e.g., flight commands) from the pilot station module and relay the flight control data to the UA client module. In block 541, the processor may facilitate the UA client module in relaying the UA flight control data to the UA.

In determination block 543, the processor may determine whether the piloted mission is complete. Determination block 543 corresponds to determination block 527 of the method 500, and thus a description is omitted for brevity. In response to determining that the piloted mission is not complete (i.e., determination block 543="No"), the processor may facilitate the UA client module in receiving flight control feedback data in block 535 as described. In response to determining that the piloted mission is complete (i.e., determination block 543="Yes"), the processor may facilitate the UA client module in taking back control of the UA for continuing autonomous flight in blocks 545. In block 529, the processor may facilitate the UA client module in controlling the UA back to a drone base, terminal destination, or continuing with autonomous flight.

Figure 5C:
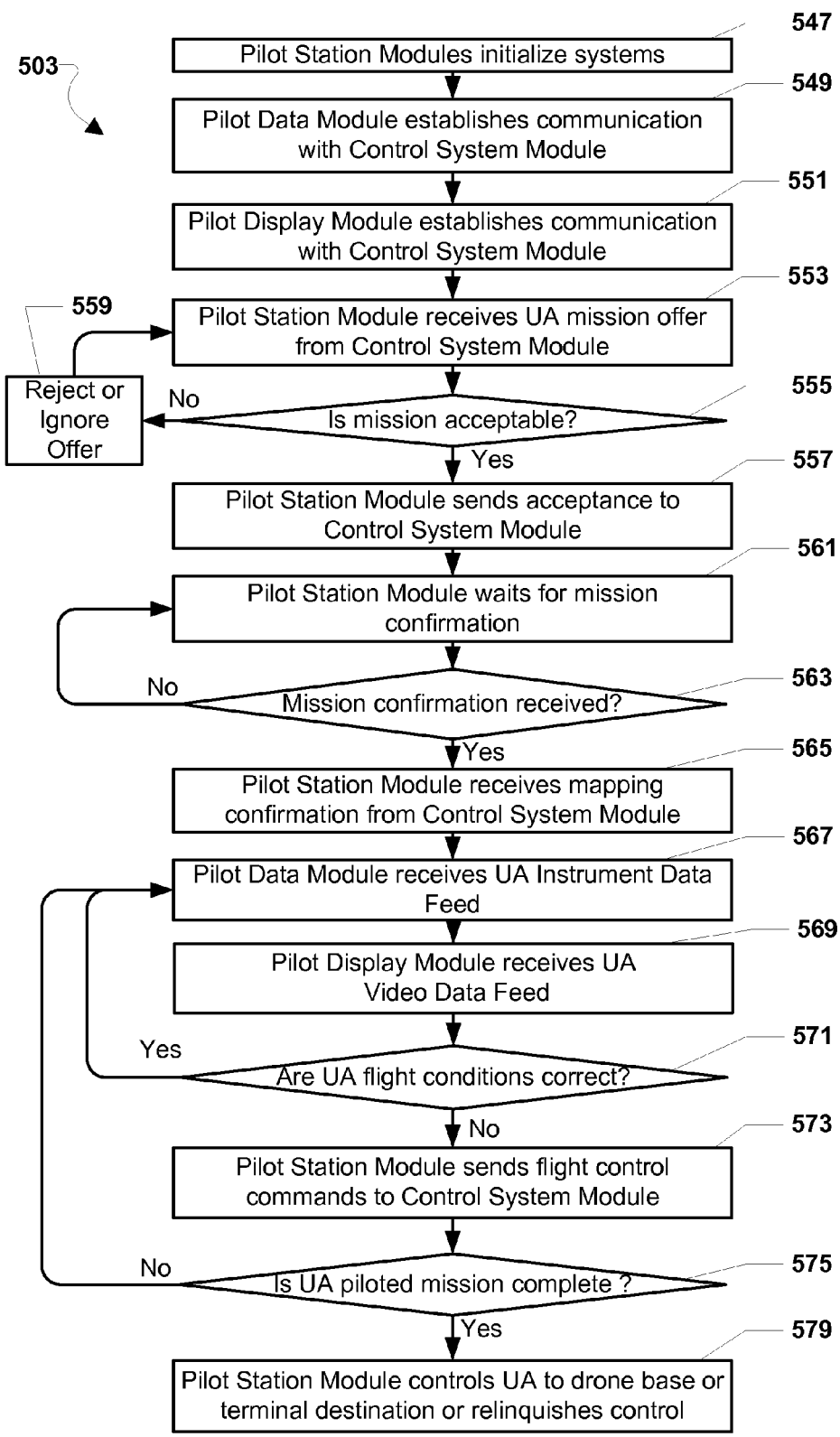
FIG. 5C is a process flow diagram illustrating a method in which a pilot station receives and accepts a UA mission and conducts piloted UA flight according to various embodiments.

FIG. 5C illustrates a method 503 in which a pilot station including a processor of the pilot station may receive an offer for a mission, accept the offer, and conduct piloted flight of a UA (e.g., 100, 100a-100g in FIGS. 1-4C) in accordance with various embodiments. With reference to FIGS. 1A-5C, in block 547, the processor of the pilot station module or modules may initialize the pilot station systems, such as the pilot display system and the pilot instrument system. For example, the processors of the pilot station modules may at least initialize systems enabling the pilot station modules to receive a mission offer. In some embodiments, the processor of the pilot station module may initialize a pilot station module (e.g., pilot station module 330), and/or an individual pilot station instrument client or pilot data module (e.g., pilot data module 331) and a pilot station display, video client, or pilot display module (e.g., pilot display module 333). In some embodiments, one or more of the pilot station module, the pilot data module, and the pilot display module may share a common processor or may have individual processors. Thus, for example, reference to "the processor of the pilot data module," "the processor of the pilot display module," etc. may refer to an individual processor or a shared processor.

In block 549, the processor of the pilot data module may establish communication with the control system module (e.g., control system module 340). In block 551, the processor of the pilot display module may establish communication with the control system module.

In block 553, the processor of the pilot station module may receive a piloting mission offer from the control system module. In some embodiments, mission offers may be time sensitive requiring the processor of the pilot station module to provide an acceptance within a certain period of time. The period of time may depend on the urgency of the mission requirement. In some situations, such as when the urgency of the mission is high, the period of time may be relatively short such as minutes or hours. In some situations, such as when the urgency is low or when the mission planning time horizon is long, the period of time may be relatively long such as days, weeks, months, or longer. When the time period for the mission offer expires, a new mission offer may be sent with the same criteria. Alternatively, a new mission offer may be sent with different pilot criteria, such as when conditions have changed. In some situations, such as when a mission offer is based on a weather condition, no new mission offer may be sent after the expiration of the mission offer, such as when the transition condition abates.

In determination block 555, the processor of the pilot station module may determine whether the mission is acceptable. For example, the processor of the pilot station module may determine that the mission is unacceptable when the pilot may be qualified but unavailable for the mission. A pilot or other authorized individual may interact with the pilot station module through a user interface by which information about the pilot's availability or acceptance of the mission may be provided.

In response to determining that the mission is not acceptable (i.e., determination block 555="No"), the processor of the pilot station module may reject or ignore the mission offer in block 559, and continue to receive mission offers in block 553.

In response to determining that the mission is acceptable (i.e., determination block 555="Yes"), the processor of the pilot station module may send an acceptance to the control system module in block 557. In block 561, the processor of the pilot station module may wait for confirmation of the mission. For example, the processor of the pilot station module may send an acceptance of the mission along with one or more additional pilot station modules. The multiple acceptances may be evaluated by the control system module and a pilot station may be selected from among the accepting pilot stations. Unselected ones of the accepting pilot stations may be placed on a reserve list for later selection.

In determination block 563, the processor of the pilot station module may determine whether a mission confirmation has been received. For example, the processor of the pilot station module may receive a confirmation from the control system module of selection. In response to determining that a confirmation has not been received (i.e., determination block 563="No"), the processor of the pilot station module may continue to wait for confirmation in block 561.

In response to determining that a confirmation has been received (i.e., determination block 563="Yes"), the processor of the pilot station module may receive a mapping confirmation from the control system module in block 565. In block 567, the processor of the pilot data module may receive a UA flight instrument data feed from the control system module. For example, the control system module may relay the UA flight instrument data feed from the UA client module as described herein. Alternatively or additionally, in block 569, the processor of the pilot display module receives UA flight video data feed from the control system module. For example, the control system module may relay the UA flight video data feed from the UA client module as described herein. By receiving the UA flight instrument data feed and the flight video data feed, which may be displayed on the pilot station display, a pilot operating the pilot station may observe the flight conditions of the UA. In some embodiments, both the flight video data feed and the flight instrument data feed may be received and processed by the pilot station module. In some embodiments, only one of the flight video data feed or the flight instrument data feed may be received by the pilot station module and used for control of the UA.

In determination block 571, the processor of the pilot station module may determine whether the UA flight conditions are correct, such as for the given flight control data/commands. In other words, the processor of the pilot station module may receive and evaluate feedback that enables the processor of the pilot station module to determine whether transmitted flight commands associated with the flight control data have been executed by the UA. For example, the processor of the pilot station module and/or the processor of the pilot data module may receive instrument data that the processor(s) can analyze to determine whether the UA is maneuvering in a manner consistent with the transmitted flight commands. Alternatively or additionally, a pilot may observe the flight conditions of the UA, such as on a pilot station display driven by the processor of the pilot display module, to confirm that flight commands have been executed. For example, the pilot may apply a right turn control to a joystick or yoke and upon receiving the flight video feed portion of the flight control feedback data may confirm that a right turn was successfully executed by the UA. In response to determining that the UA flight conditions are correct (i.e., determination block 571="Yes"), the processor of the pilot station module may continue to receive UA instrument data in block 567.

In response to determining that the UA flight conditions are not correct (i.e., determination block 571="No"), the processor of the pilot station module may send flight control data/commands, or additional flight control data/commands, to the control system module in block 573. The flight control data may be relayed to the UA by the control system module as described herein.

In determination block 575, the processor of the pilot station module may determine whether the UA piloted mission is complete. For example, the processor of the pilot station module may receive a notification from the control system module that the transition condition has abated or a new condition has arisen that no longer requires a pilot, or that requires a different pilot. In response to determining that the piloted mission is not complete (i.e., determination block 575="No"), the processor of the pilot station module may continue to receive UA instrument data in block 567. In response to determining that the piloted mission is complete (i.e., determination block 575="Yes"), the processor of the pilot station module may control the UA to designation location, or may simply relinquish control of the UA in block 579.

Figure 6A:
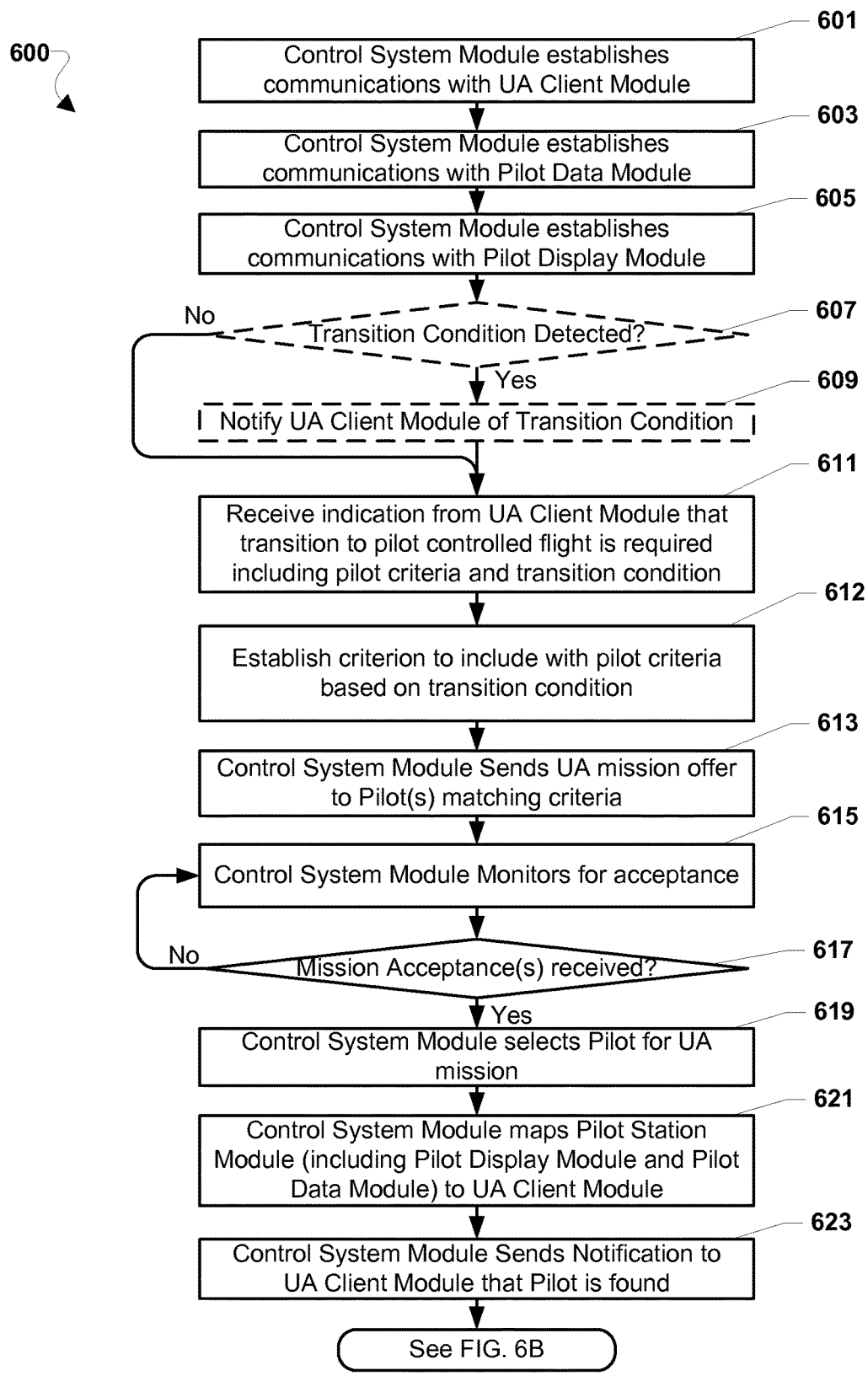
FIG. 6A is a process flow diagram illustrating a method in which a control system/server/gateway communicates with a UA client and a pilot station to provide offers to pilot stations and receive acceptances from pilot stations for a UA mission according to various embodiments.

FIG. 6A illustrates a method 600 that may be implemented in a server for providing a transition from autonomous to piloted flight for a UA according to various embodiments. With reference to FIGS. 1A-6A, the method 600 may be performed by a control system module (e.g., server 240, control system module 340), and a UA 100, 100a-100g.

In block 601, a processor of the control system module may establish communications with the UA client module. For example, the processor of the control system module may connect to the UA client module through an RF module on the UA that is configured to support multiple communication connections, such as Wi-Fi, local area network (LAN), or other short range communication, cellular or Wide Area Network (WAN) connection, or possibly a wired connection when the UA is coupled to a base station, charging station or other stationary communication station. The UA may support network connections and communications using Internet Protocol (IP) or similar network protocol. In some embodiments, the processor of the control system module may establish a connection with the UA through a series of intermediate nodes. The processor of the control system module may accept an Internet based connection from the UA. The communication with the UA client and the pilot station clients may be through a secure socket communication to prevent intrusion.

In block 603, the processor of the control system module may establish communications with the pilot data module. In block 605, the processor of the control system module may establish communications with the pilot data module. For example, the processor of the control system module may connect to the pilot data module and the pilot display module through an RF module (not shown) or wired connection interface on the pilot station. The RF module of the pilot station may be configured to support multiple communication connections, such as Wi-Fi, local area network (LAN), or other short-range communication, cellular or Wide Area Network (WAN) connection. Alternatively or additionally, the pilot station may be configured for a wired connection. The pilot station may support network connections and communications using Internet Protocol (IP) or similar network protocol. In some embodiments, the server may establish a connection with the pilot station through a series of intermediate nodes. The server may accept an Internet based connection from the pilot station.

In optional determination block 607, the processor of the control system module may determine whether a transition condition has been detected. For example, the processor of the control system module may determine whether an impending weather condition or other condition has been detected by the UA that may require a transition. In response to determining that the transition condition has been detected (i.e., optional determination block 607="Yes"), the processor of the control system module may optionally notify the UA client module of the transition condition in block 609.

In response to determining that the transition condition has not been detected (i.e., determination block 607="No") or following block 605, the processor of the control module server may receive an indication from the UA client module that a transition from autonomous flight to pilot controlled flight is required including pilot criteria and a condition associated with the transition in block 611. For example, the indication may be a request from the UA client module for a pilot including required pilot criteria. For example, the UA client module may detect from instruments on the UA that a transition condition has occurred or is impending and in response may transmit a pilot request to the control system module as described herein. In some embodiments, rather than transitioning from autonomous flight, the transition may be based on piloted flight to piloted flight with new pilot criteria.

In block 612, the processor of the control system module may establish a criterion for including with the pilot criteria based on the transition condition. For example, the processor of the control system module may evaluate the transition condition and determine that additional pilot criteria are required and establish the additional criteria to be included in the pilot criteria with the mission offer. In block 613, the processor of the control system module may send a UA piloting mission offer to one or more pilots satisfying the pilot criteria.

In block 615, the processor of the control system module may monitor for acceptances from the one or more pilots. In determination block 617, the processor of the control system module may determine whether mission acceptances have been received. In response to determining that mission acceptances have not been received (i.e., determination block 617="No"), the processor of the control system module may continue to monitor for acceptances in block 615.

In response to determining that mission acceptances have been received (i.e., determination block 617="Yes"), the processor of the control system module may select one of the accepting pilot stations in block 619. In the event only one pilot station accepts the mission, the processor of the control system module may select the accepting pilot station or may wait to receive more acceptances up to a designated time. As described, mission offers may be sent with an expiration time period. When the time period expires the mission offer may be considered withdrawn or invalid. Alternatively, expired mission offers may be accepted. If the expired mission offer has not yet been fulfilled and a pilot is still needed for the mission, an acceptance after expiry may result in a pilot selection. New/replacement mission offers may or may not be generated upon the expiration of a mission offer. In the event the transition condition is urgent the processor of the control station module may immediately select the first pilot station to accept the mission offer. In some embodiments, despite receiving a certain number of acceptances, the processor of the control system module may continue to monitor for acceptances if an unacceptable number of acceptances have been received or if the qualifications of the accepting pilots/pilot station modules are marginal. In other words, despite the accepting pilots/pilot station modules meeting the basic pilot criteria, the processor of the control system module may wait for the most highly qualified pilots/pilot station modules to accept before making a selection.

In block 621, the processor of the control system module may map the pilot station module to the UA client module. For example, the processor of the control system module may map communication address information, port information, socket information or other communication related information so that communications can be successfully relayed between the pilot station module and the UA client module. In block 623, the processor of the control system module may send a notification to the UA client module that a pilot has been found. The processor of the control system module may further provide the mapping information for the pilot station module to the UA client module.

Figure 6B:
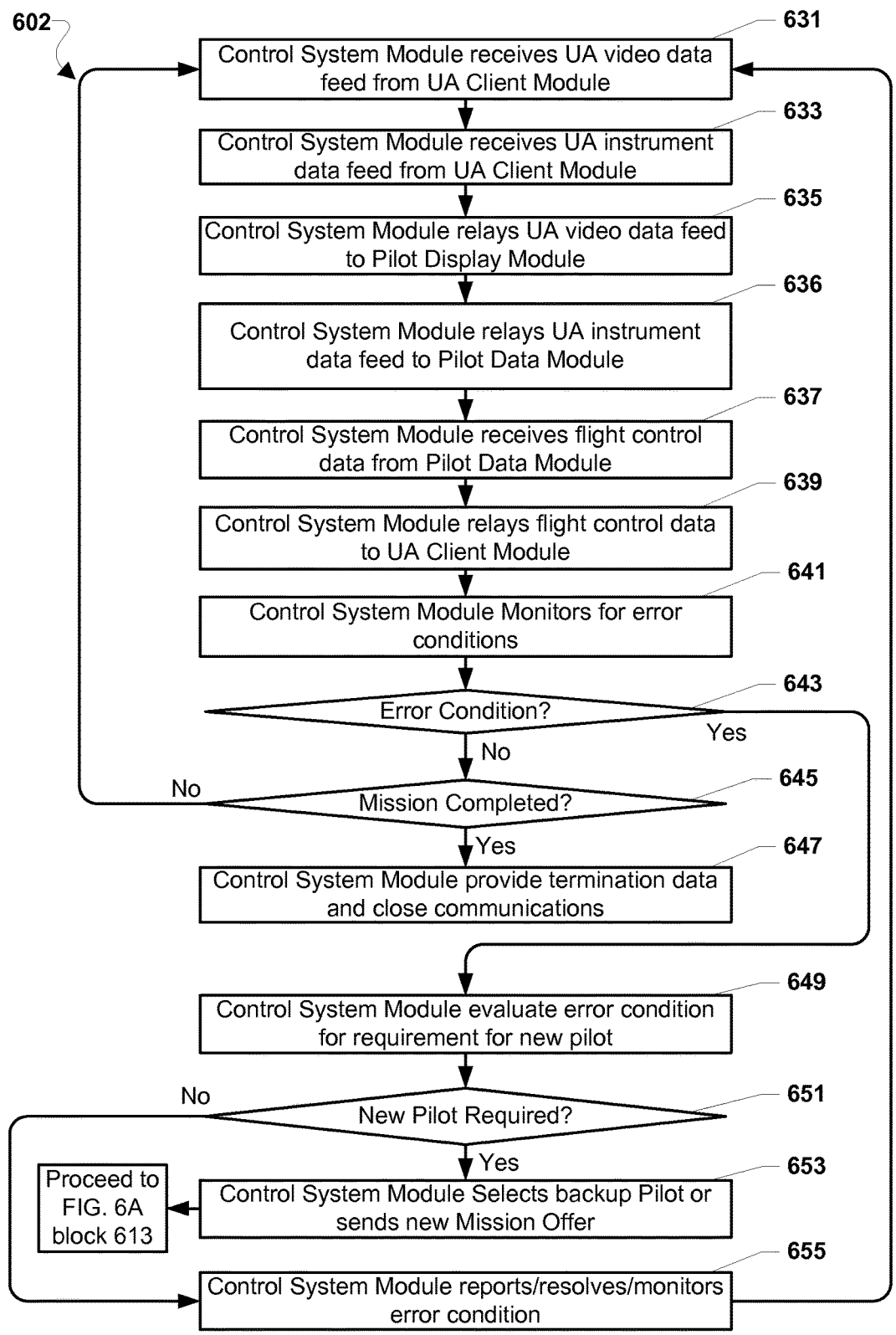
FIG. 6B is a process flow diagram illustrating a method in which a control system/server/gateway receives UA mission related data from a UA client and relays the UA mission related data to a pilot station, and receives flight control data from the pilot station and relays the flight control data to a UA client according to various embodiments.

FIG. 6B illustrates a method 602 for conducting piloted flight according to various embodiments. With reference to FIGS. 1A-6B, the method 602 may be performed by a control system module (e.g., server 240, control system module 340) for conducting piloted flight for a UA, such as the UA 100, 100a, 100b, and 100c-100g. The method 602 may be a continuation of the method 600. It should be noted that the order of the blocks in the methods 600 and 602 are for illustration purposes only, and the order is not intended to be limiting.

In block 631, the processor of the control system module may receive the UA flight video data feed, such as from the UA client module. In block 633, the processor of the control system module may receive the UA flight instrument data feed, such as from the UA client module. In block 635, the processor of the control system module may relay the UA flight video data feed to the pilot station, such as to the pilot display module. In block 636, the processor of the control system module may relay the UA flight instrument data feed to the pilot station, such as the pilot data module. The operations of the blocks 631, 633, 635, and 636 may be performed concurrently or near-concurrently or in no particular order. For example, the processor of the control system module may receive the flight instrument and the flight video data feeds concurrently and may immediately relay the flight instrument and the flight video data feeds to the pilot station module and/or to individual ones of the pilot data module and pilot display module.

The speed at which data is relayed may be critical to piloting effectiveness. Any latency in the data transfer of flight control data to and flight control feedback data from the UA may result in control lag, such as delay in applying a control, having the control executed, and observing or detecting feedback that the control was executed. In some embodiments, the quality of the communication links between the UA and the control system module and between the control system module and the pilot station module may determine the latency. In some embodiments, the quality of the communication link may be known and may lead to a known degree of latency between the application of control and the receipt of feedback. Since the latency may provide a distorted sense of control, some pilots may have more experience piloting with high levels of latency. Therefore, piloting in high latency environments due to poor link conditions may form one of the pilot selection criteria. Further, high latency due to poor link quality may be included in the transition conditions in some embodiments.

In block 637, the processor of the control system module may receive flight control data from the pilot station, such as the pilot data module. In block 639, the processor of the control system module may relay the flight control data to the UA, such as to the UA client module. In block 641, the control system server may monitor for error conditions, such as from one or both of the pilot station and the UA. The error condition may include a new transition condition or may lead to a transition condition or another error condition.

In determination block 643, the processor of the control system module may determine whether an error condition is present. In response to determining that the error condition is not present (i.e., determination block 643="No") the processor of the control system module may determine whether the mission is completed in determination block 645. In response to determining that the mission is not complete (i.e., determination block 645="No"), the processor of the control system module may continue to receive the UA flight video data feed from the UA client in block 631. In response to determining that the mission is complete (i.e., determination block 645="Yes"), the processor of the control system module may provide termination data and close the communications in block 647. For example, the processor of the control system module may provide final flight destination information, final weather information, or other information sufficient to enable the UA to return to autonomous flight. In some embodiments, the processor of the control system module may close communications with the pilot station only and may maintain communications with the UA in the event further piloted flight is required.

In response to determining that the error condition is present (i.e., determination block 643="Yes"), the processor of the control system module may evaluate the error condition for the need for a new pilot in block 649. For example, as described, the link quality may degrade to the point where the resulting latency presents a problem for a pilot without special qualifications. In determination block 651, the processor of the control system module may determine whether a new pilot is required based on the error condition.

In response to determining that the new pilot is required (i.e., determination block 651="Yes"), the processor of the control system module may select a backup pilot from the reserve list or may transmit a new mission offer in block 653 and perform the method 600 for transitioning to a new pilot as described. In response to determining that the new pilot is not required (i.e., determination block 651="No"), the processor of the control system module may report, resolve, or continue to monitor the error condition in block 655, and continue performing the method 602 by returning to block 631. In some embodiments, if the error condition is sufficiently severe, such as a fire or other emergency, the processor of the control system module may attempt to perform remedial measures including (but not limited to) providing emergency alerts to the UA and pilot station, or other entities, providing instructing for an autonomous or piloted emergency landing, providing alerts to authorities, or a combination of actions.

Figure 7:
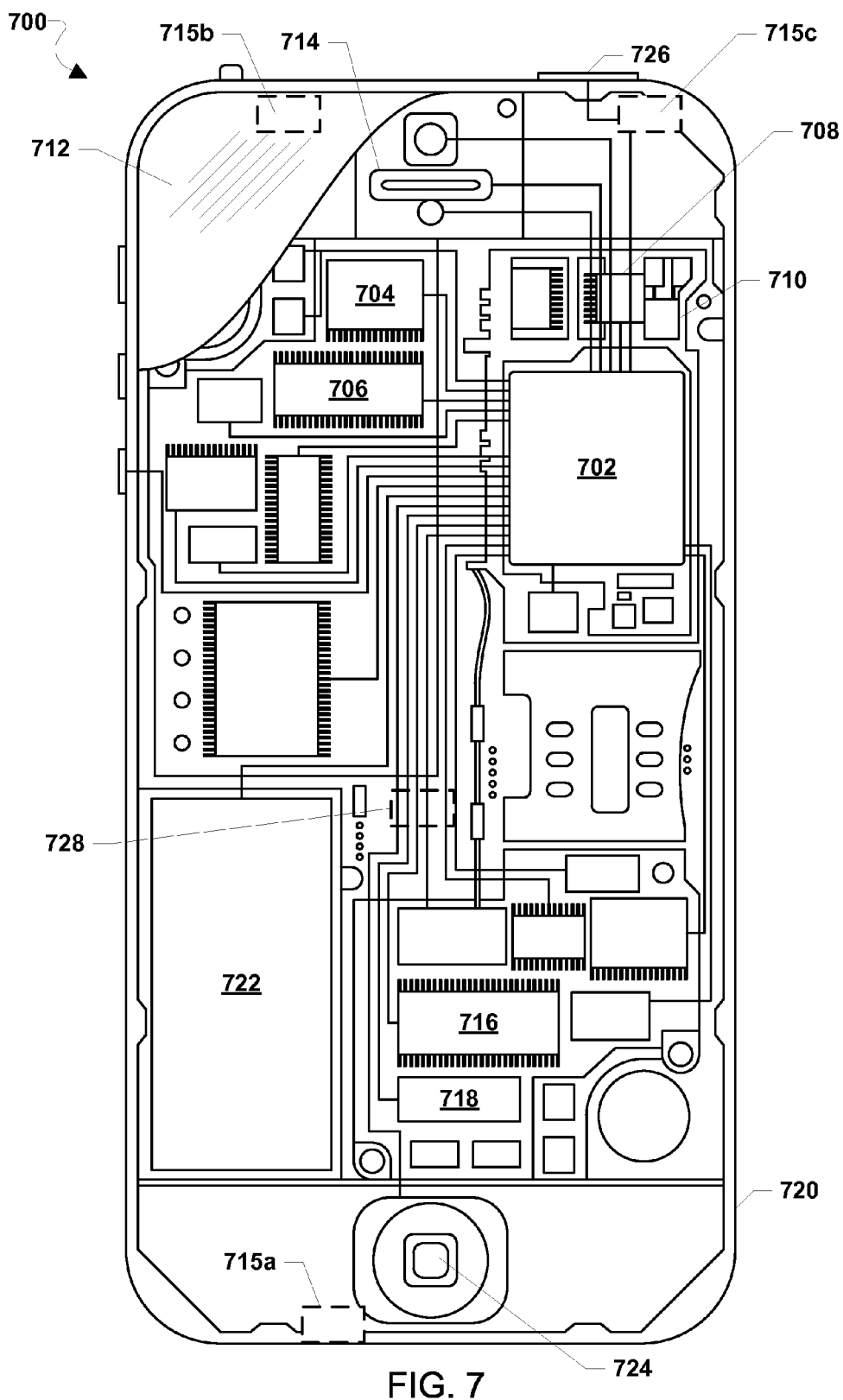
FIG. 7 is a component diagram of an example mobile computing device suitable for use with various embodiments.

In various embodiments, the pilot station may control a UA 100, whether communicating through an access device, cellular networks, or other communication links, using any of a variety of mobile computing devices (e.g., smartphones, tablets, etc.) an example in the form of a smartphone or mobile computing device 700 is illustrated in FIG. 7. With reference to FIGS. 1-7, the mobile computing device 700 may include a processor 702 coupled to the various systems of the mobile computing device 700. For example, the processor 702 may be coupled to a touch screen controller 704, radio communication elements, speakers and microphones, and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. In another embodiment (not shown), the mobile computing device 700 may also be coupled to an external memory, such as an external hard drive.

The touch screen controller 704 and the processor 702 may also be coupled to a touch screen panel 712, such as a resistive-sensing touch screen, capacitive-sensing touch screen, infrared sensing touch screen, etc. Additionally, the display of the mobile computing device 700 need not have touch screen capability. The mobile computing device 700 may have one or more radio signal transceivers 708 (e.g., Peanut, Bluetooth, Bluetooth LE, Zigbee, Wi-Fi, RF radio, etc.) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

In some embodiments, the mobile computing device 700 may include microphones 715. For example, the mobile computing device may have a conventional microphone 715a for receiving voice or other audio frequency energy from a user during a call. The mobile computing device 700 may further be configured with additional microphones 715b and 715c, which may be configured to receive audio including ultrasound signals. Alternatively, all microphones 715a, 715b, and 715c may be configured to receive ultrasound signals. The microphones 715 may be piezo-electric transducers, or other conventional microphone elements. Because more than one microphone 715 may be used, relative location information may be received in connection with a received ultrasound signal through various triangulation methods. At least two microphones 715 configured to receive ultrasound signals may be used to generate position information for an emitter of ultrasound energy.

The mobile computing device 700 may also include speakers 714 for providing audio outputs. The mobile computing device 700 may also include a housing 720, constructed of a plastic, metal, or a combination of materials, for containing all or some of the components discussed herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

In some embodiments, the mobile computing device 700 may further include an accelerometer 728, which senses movement, vibration, and other aspects of the device through the ability to detect multi-directional values of and changes in acceleration. In various embodiments, the accelerometer 728 may be used to determine the x, y, and z positions of the mobile computing device 700. Using the information from the accelerometer, a pointing direction of the mobile computing device 700 may be detected.

Figure 8:
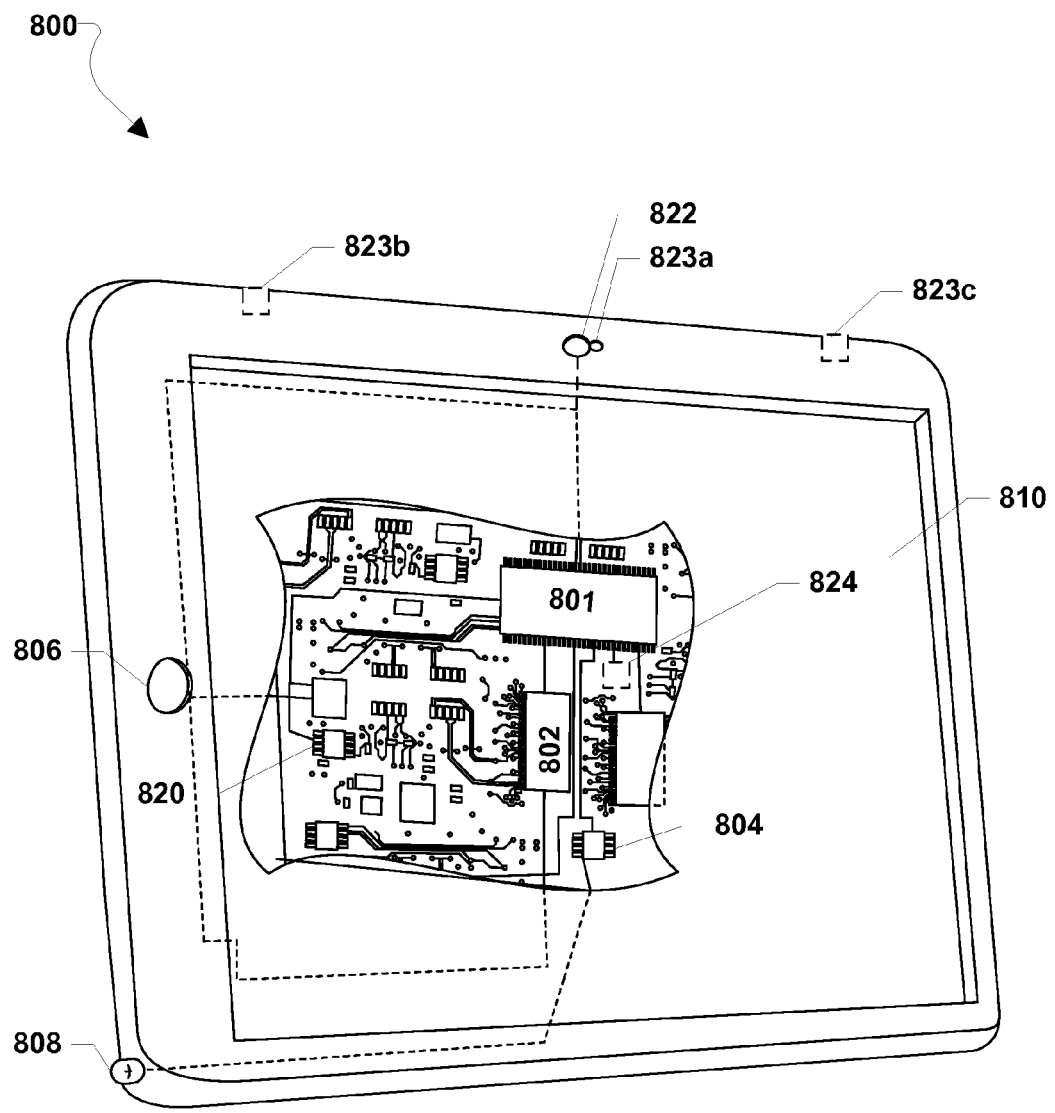
FIG. 8 is a component diagram of an example mobile computing device suitable for use with various embodiments.

Various embodiments may be implemented in any of a variety of tablet mobile computing devices, an example of which (800) is illustrated in FIG. 8. For example, with reference to FIGS. 1-8, a tablet mobile computing device 800 may include a processor 801 coupled to internal memory 802. The internal memory 802 may be volatile or non-volatile memory, and may also be secure and/or encrypted memory, or unsecure and/or unencrypted memory, or any combination thereof. The processor 801 may also be coupled to a touch screen display 810, such as a resistive-sensing touch screen, capacitive-sensing touch screen infrared sensing touch screen, etc. The tablet mobile computing device 800 may have one or more radio signal transceivers 804 (e.g., Peanut, Bluetooth, ZigBee, Wi-Fi, RF radio) and antennas 808 for sending and receiving wireless signals as described herein. The transceivers 804 and antennas 808 may be used with the above-mentioned circuitry to implement the various wireless transmission protocol stacks and interfaces. The tablet mobile computing device 800 may include a cellular network wireless modem chip 820 that enables communication via a cellular network. The tablet mobile computing device 800 may also include a physical button 806 for receiving user inputs. The tablet mobile computing device 800 may also include various sensors coupled to the processor 801, such as a camera 822, a microphone or microphones 823, and an accelerometer 824.

For example, the tablet mobile computing device 800 may have a conventional microphone 823a for receiving voice or other audio frequency energy from a user during a call or other voice frequency activity. The tablet mobile computing device 800 may further be configured with additional microphones 823b and 823c, which may be configured to receive audio including ultrasound signals. Alternatively, all microphones 823a, 823b, and 823c may be configured to receive ultrasound signals. The microphones 823 may be piezo-electric transducers, or other conventional microphone elements. Because more than one microphone 823 may be used, relative location information may be received in connection with a received ultrasound signal through various methods such as time of flight measurement, triangulation, and similar methods. At least two microphones 823 that are configured to receive ultrasound signals may be used to generate position information for an emitter of ultrasound energy.

Also in some embodiments, the tablet mobile computing device 800 may further include the accelerometer 824, which senses movement, vibration, and other aspects of the tablet mobile computing device 800 through the ability to detect multi-directional values of and changes in acceleration. In various embodiments, the accelerometer 824 may be used to determine the x, y, and z positions of the tablet mobile computing device 800. Using the information from the accelerometer 824, a pointing direction of the tablet mobile computing device 800 may be detected.

Figure 9:
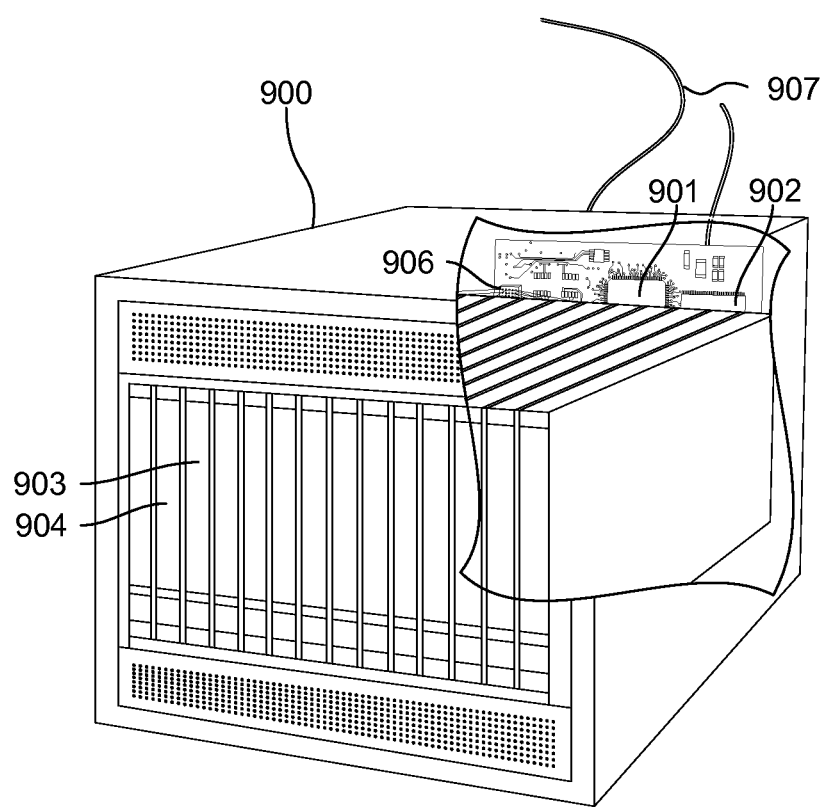
FIG. 9 is a component diagram of an example server suitable for use with various embodiments.

Various embodiments may also be implemented on any of a variety of commercially available server mobile devices, such as the server 900 illustrated in FIG. 9. With reference to FIGS. 1-9, such a server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing network interface connections with a network 907, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 702, 801, and 901 may be any programmable microprocessor, microcomputer or multiple processor chip or chips that can be configured by software instructions (applications) to perform a variety of functions, including the functions of various embodiments described above. In some mobile devices, multiple processors may be provided, such as one processor dedicated to wireless communication functions and one processor dedicated to running other applications. Typically, software applications may be stored in the internal memory 706, 811, 813, 902, and 903 before they are accessed and loaded into the processors 702, 801, and 901. The processors 702, 801, and 901 may include internal memory sufficient to store the application software instructions. In many mobile devices the internal memory may be a volatile or nonvolatile memory, such as flash memory, or a mixture of both. For the purposes of this description, a general reference to memory refers to memory accessible by the processors 702, 801, and 901 including internal memory or removable memory plugged into the mobile device and memory within the processor 702, 801, and 901 themselves.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present invention is not intended to be limited to the embodiments shown herein but is to be accorded the widest scope consistent with the following claims and the principles and novel features disclosed herein.

What is claimed is:

1. A method for selecting a pilot to take control of an unmanned aircraft (UA), comprising:
   receiving, by a server, an indication from the UA in autonomous flight that a transition condition is detected, wherein the transition condition comprises at least one of a plurality of conditions that require the UA to transition from autonomous flight to pilot controlled flight;
   determining, by the server, a set of pilot selection criteria that corresponds to the detected transition condition, wherein the set of pilot selection criteria enables selection of a pilot at a pilot station that is capable of providing pilot controlled flight of the UA under the detected transition condition, and wherein the set of pilot selection criteria comprises one or more of an overall length of pilot experience, a length of pilot experience in piloting unmanned aircraft under the detected condition, a length of pilot experience associated with the UA, a pilot physical condition, a pilot mental condition, a pilot flight recency, a pilot flight certification status, a pilot medical certification status, a pilot incident history, or a pilot crash history; and
   selecting, by the server, the pilot station for providing pilot controlled flight of the UA based on the set of pilot selection criteria that corresponds to the detected transition condition.

2. The method of claim 1, further comprising:
   linking, by the server, the selected pilot station to the UA; and
   relaying, by the server, flight control feedback data from the UA to the selected pilot station and flight control data from the selected pilot station to the UA.

3. The method of claim 1, wherein the set of pilot selection criteria that corresponds to the detected transition condition further comprises one or more of:
   a pilot affiliation;
   a pilot qualification;
   a pilot ready status;
   a pilot availability status;
   a geographic proximity of the pilot to the UA; or
   a quality of a network connection of the pilot.

4. The method of claim 1, wherein the detected transition condition comprises one or more of:
   a weather condition;
   a geographic condition;
   a visibility condition;
   a UA mechanical condition;
   a UA instrument condition;
   a communication link quality condition;
   a mission requirement condition;
   a UA type; or
   a UA characteristic.

5. The method of claim 1, wherein selecting, by the server, the pilot station for providing pilot controlled flight of the UA based on the set of pilot selection criteria that corresponds to the detected transition condition comprises:
  selecting, by the server, one or more pilot candidates to pilot the UA based on the pilot selection criteria; and
  transmitting, by the server, a mission offer to the one or more pilot candidates to pilot the UA.

6. The method of claim 5, further comprising:
  receiving, by the server, an acceptance from any of the one or more pilot candidates that are accepting the mission offer to pilot the UA; and
  selecting, by the server, a pilot candidate from among the one or more pilot candidates that are accepting the mission offer to pilot the UA based on the set of pilot selection criteria that corresponds to the detected transition condition.

7. An apparatus for managing selecting a pilot to take control of an unmanned aircraft (UA), comprising:
  a transceiver; and
  a server processor coupled to the transceiver, the server processor configured with processor-executable instructions to:
    receive an indication from the UA in autonomous flight that a transition condition is detected, wherein the transition condition comprises at least one of a plurality of conditions that require the UA to transition from autonomous flight to pilot controlled flight;
    determine a set of pilot selection criteria that correspond to the detected transition condition, wherein the set of pilot selection criteria enables selection of a pilot at a pilot station that is capable of providing pilot controlled flight of the UA under the detected transition condition, and wherein the set of pilot selection criteria comprises one or more of an overall length of pilot experience, a length of pilot experience in piloting unmanned aircraft under the detected condition, a length of pilot experience associated with the UA, a pilot physical condition, a pilot mental condition, a pilot flight recency, a pilot flight certification status, a pilot medical certification status, a pilot incident history, or a pilot crash history; and
    select the pilot station for providing pilot controlled flight of the UA based on the set of pilot selection criteria that corresponds to the detected transition condition.

8. The apparatus of claim 7, wherein the server processor is further configured with processor-executable instructions to:
  link the selected pilot station to the UA; and
  relay flight control feedback data from the UA to the selected pilot station and flight control data from the selected pilot station to the UA.

9. The apparatus of claim 7, wherein the set of pilot selection criteria that corresponds to the detected transition condition further comprises one or more of:
  a pilot affiliation;
  a pilot qualification;
  a pilot ready status;
  a pilot availability status;
  a geographic proximity of the pilot to the UA; or
  a quality of a network connection of the pilot.

10. The apparatus of claim 7, wherein the detected transition condition comprises one or more of:
  a weather condition;
  a geographic condition;
  a visibility condition;
  a UA mechanical condition;
  a UA instrument condition;
  a communication link quality condition;
  a mission requirement condition;
  a UA type; or
  a UA characteristic.

11. The apparatus of claim 7, wherein the server processor is configured with processor-executable instructions for performing operations such that selecting the pilot station for providing pilot controlled flight of the UA based on the set of pilot selection criteria that corresponds to the detected transition condition comprises:
  selecting one or more pilot candidates to pilot the UA based on the pilot selection criteria; and
  transmitting a mission offer to the one or more pilot candidates to pilot the UA.

12. The apparatus of claim 11, wherein the server processor is further configured with processor-executable instructions to:
  receive an acceptance from any of the one or more pilot candidates that are accepting the mission offer to pilot the UA; and
  select a pilot candidate from among the one or more pilot candidates that are accepting the mission offer to pilot the UA based on the set of pilot selection criteria that correspond to the detected transition condition.

13. A method for facilitating a selection of a pilot to take control of an unmanned aircraft (UA), comprising:
  detecting, by the UA, a transition condition, wherein the transition condition comprises at least one of a plurality of conditions that require the UA to transition from autonomous flight to pilot controlled flight; and
  determining, by the UA, a set of pilot selection criteria that corresponds to the detected transition condition, wherein the set of pilot selection criteria enables selection of a pilot at a pilot station that is capable of providing pilot controlled flight of the UA under the detected transition condition, and wherein the set of pilot selection criteria comprises one or more of an overall length of pilot experience, a length of pilot experience in piloting unmanned aircraft under the detected condition, a length of pilot experience associated with the UA, a pilot physical condition, a pilot mental condition, a pilot flight recency, a pilot flight certification status, a pilot medical certification status, a pilot incident history, or a pilot crash history.

14. The method of claim 13, further comprising:
  sending, by the UA, a request for a pilot at a pilot station to perform pilot controlled flight of the UA, the request for the pilot including the set of pilot selection criteria that corresponds to the detected transition condition.

15. The method of claim 14, further comprising:
  receiving, by the UA, mapping information for the pilot station that is selected in response to the request for pilot controlled flight of the UA; and
  establishing, by the UA, a link to the selected pilot station based on the received mapping information.

16. The method of claim 15, further comprising:
  receiving, by the UA on the established link to the selected pilot station, flight control data configured to control flight of the UA; and
  relaying, by the UA on the established link to the selected pilot station, flight control feedback data to the selected pilot station.

17. The method of claim 16, wherein the flight control data comprises flight commands for enabling pilot controlled flight of the UA.

18. The method of claim 16, wherein the flight control feedback data comprises at least one of a UA flight instrument data feed and a UA flight video data feed.

19. The method of claim 13, wherein the set of pilot selection criteria that corresponds to the detected transition condition further comprises one or more of:
   a pilot affiliation;
   a pilot qualification;
   a pilot ready status;
   a pilot availability status;
   a geographic proximity of the pilot to the UA; or
   a quality of a network connection of the pilot.

20. The method of claim 13, wherein the detected transition condition comprises one or more of:
   a weather condition;
   a geographic condition;
   a visibility condition;
   a UA mechanical condition;
   a UA instrument condition;
   a communication link quality condition;
   a mission requirement condition;
   a UA type; or
   a UA characteristic.

21. An unmanned aircraft (UA), comprising:
   a transceiver; and
   a processor coupled to the transceiver, the processor configured with processor-executable instructions to:
      detect a transition condition, wherein the transition condition comprises at least one of a plurality of conditions that require the UA to transition from autonomous flight to pilot controlled flight; and
      determine a set of pilot selection criteria that corresponds to the detected transition condition, wherein the set of pilot selection criteria enables selection of a pilot at a pilot station that is capable of providing pilot controlled flight of the UA under the detected transition condition, and wherein the set of pilot selection criteria comprises one or more of an overall length of pilot experience, a length of pilot experience in piloting unmanned aircraft under the detected condition, a length of pilot experience associated with the UA, a pilot physical condition, a pilot mental condition, a pilot flight recency, a pilot flight certification status, a pilot medical certification status, a pilot incident history, or a pilot crash history.

22. The UA of claim 21, wherein the processor is further configured with processor-executable instructions to send a request for pilot controlled flight of the UA, the request including the set of pilot selection criteria that corresponds to the detected transition condition.

23. The UA of claim 22, wherein the processor is further configured with processor-executable instructions to:
   receive mapping information for a pilot station that is selected in response to the request for pilot controlled flight of the UA; and
   establish a link to the selected pilot station based on the received mapping information.

24. The UA of claim 23, wherein the processor is further configured with processor-executable instructions to:
   receive flight control data configured to control the flight of the UA; and
   relay flight control feedback data to the selected pilot station.

25. The UA of claim 24, wherein the flight control data comprises flight commands for enabling the pilot controlled flight of the UA.

26. The UA of claim 24, wherein the flight control feedback data comprises one of a UA flight instrument data feed, and a UA flight video data feed.

27. The UA of claim 21, wherein the set of pilot selection criteria that corresponds to the detected transition condition further comprises one or more of:
   a pilot affiliation;
   a pilot qualification;
   a pilot ready status;
   a pilot availability status;
   a geographic proximity of the pilot to the UA; or
   a quality of a network connection of the pilot.

28. The UA of claim 21, wherein the detected transition condition comprises one or more of:
   a weather condition;
   a geographic condition;
   a visibility condition;
   a UA mechanical condition;
   a UA instrument condition;
   a communication link quality condition;
   a mission requirement condition;
   a UA type; or
   a UA characteristic.

* * * * *